United States Patent [19]
Mitsunari

[11] Patent Number: 5,025,879
[45] Date of Patent: Jun. 25, 1991

[54] DRIVING CONTROL APPARATUS FOR AUTOMOBILE

[76] Inventor: Masahiko Mitsunari, 1-55-202, Kimikagecho 2-chome, Kita-ku, Kobe-shi, Hyogo-ken, Japan

[21] Appl. No.: 299,687

[22] Filed: Jan. 23, 1989

[30] Foreign Application Priority Data

Jan. 22, 1988 [JP] Japan .................................. 63-13188

[51] Int. Cl.$^5$ ............................................ B62D 6/04
[52] U.S. Cl. ......................................... 180/79; 280/91
[58] Field of Search ..................... 180/140, 79.1, 6.26, 180/6.28, 6.3, 6.32, 197; 280/91

[56] References Cited

U.S. PATENT DOCUMENTS

| | | | |
|---|---|---|---|
| 3,756,335 | 9/1973 | Eisele et al. ........................ | 180/6.28 |
| 4,690,431 | 9/1987 | Ito et al. ........................... | 180/140 X |
| 4,747,461 | 5/1988 | Hayn et al. .......................... | 180/197 |
| 4,753,312 | 6/1988 | Burgdorf et al. .................... | 180/197 |

FOREIGN PATENT DOCUMENTS

| | | | |
|---|---|---|---|
| 3734477 | 4/1988 | Fed. Rep. of Germany ...... | 180/140 |
| 0162371 | 7/1988 | Japan ................................. | 180/140 |

Primary Examiner—Charles A. Marmor
Assistant Examiner—Alan M. Kagen
Attorney, Agent, or Firm—Wenderoth, Lind & Ponack

[57] ABSTRACT

There is disclosed a vehicle steering and controlling apparatus, which controls the steering angle of and the braking force or the driving force acting on each wheel according to the direction of the resultant force caused by the acceleration of the car body acting on each wheel and the traveling direction and turning radius desired by a driver to thereby improve the vehicle's traveling stability by enabling turning while traveling at the turning radius desired by the vehicle's driver.

1 Claim, 33 Drawing Sheets (1)

(2)

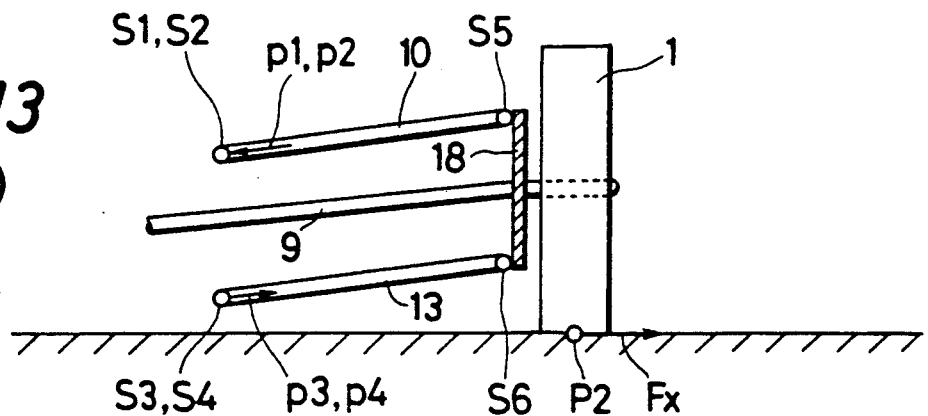
Fig.13 (1)
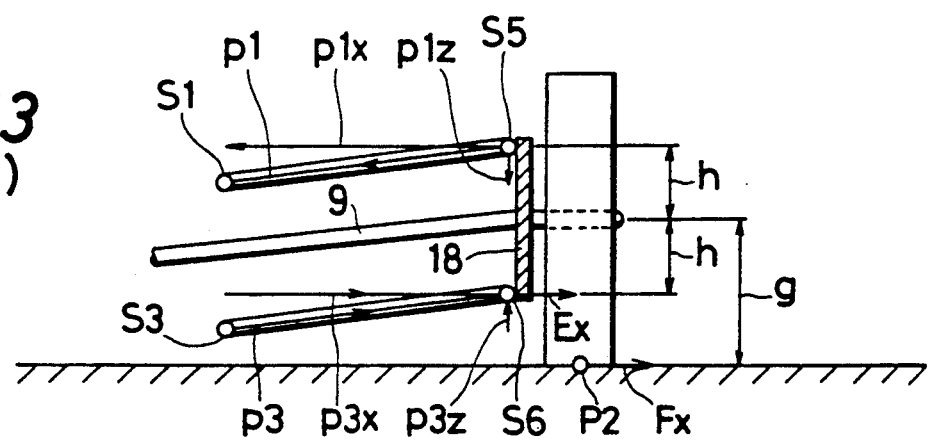
Fig.13 (2)
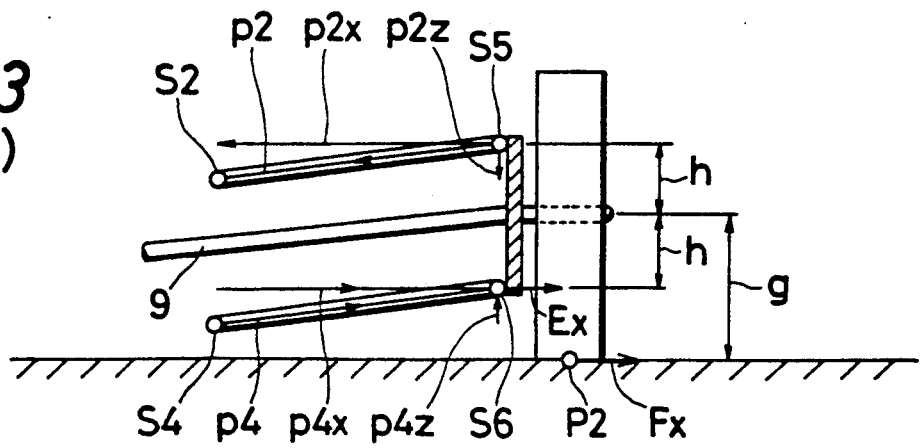
Fig.13 (3)

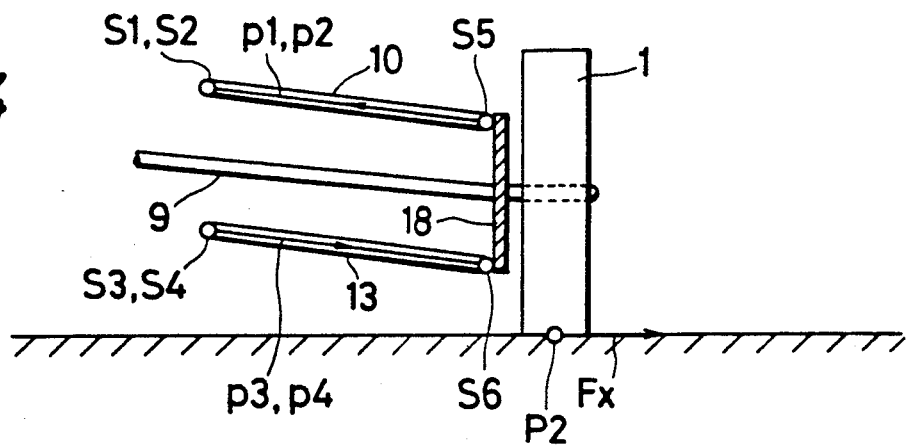
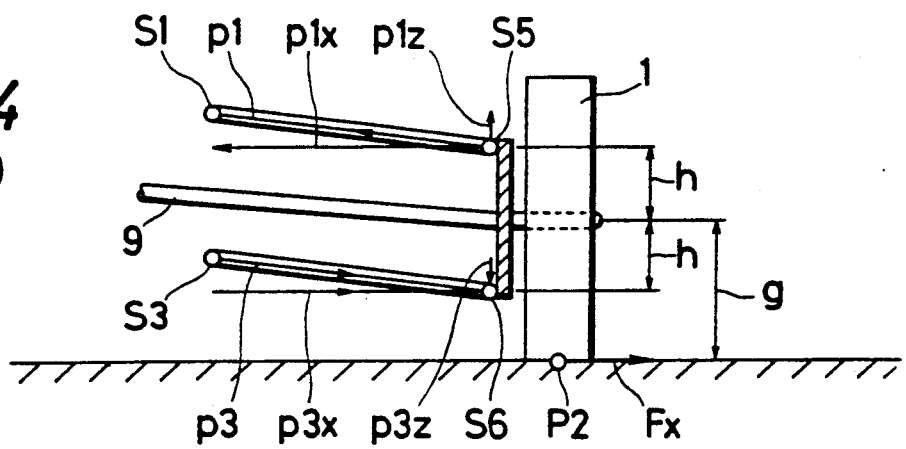
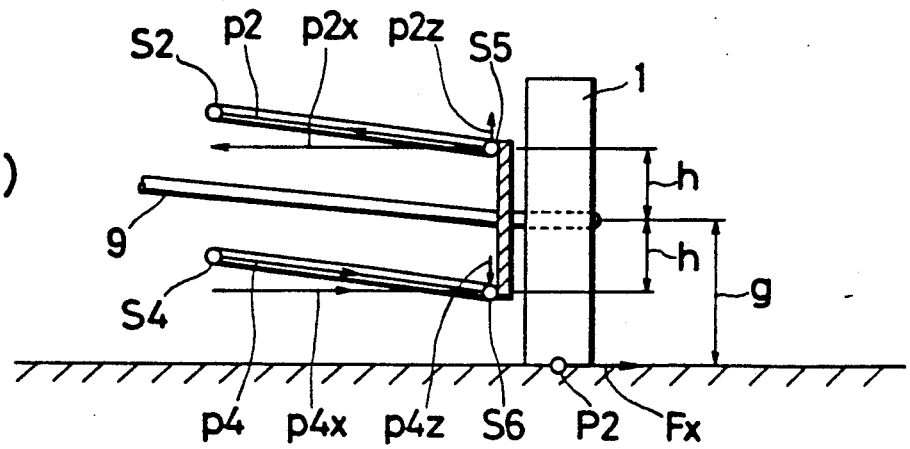

Fig. 15 (1)
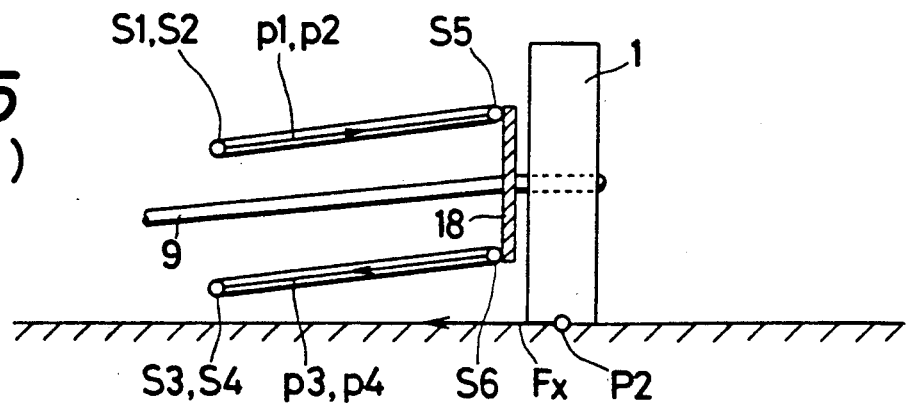
Fig. 15 (2)
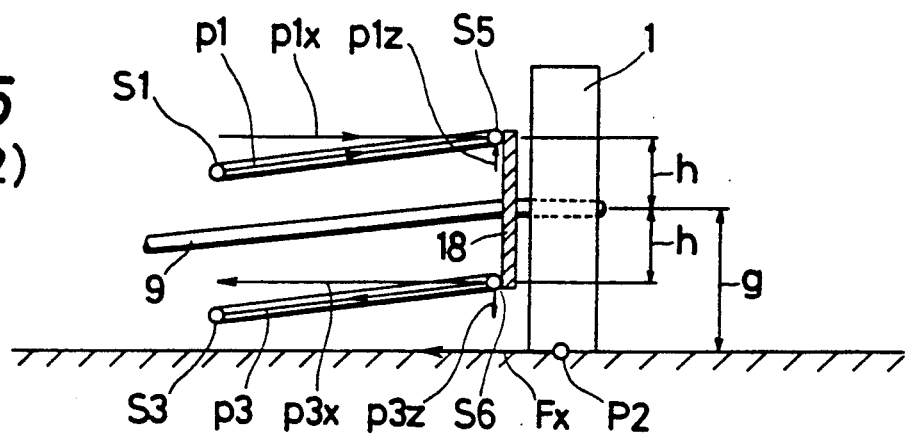
Fig. 15 (3)
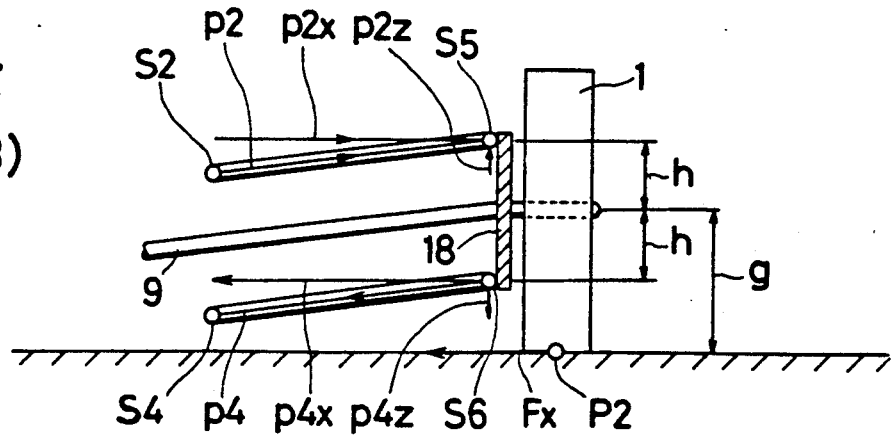

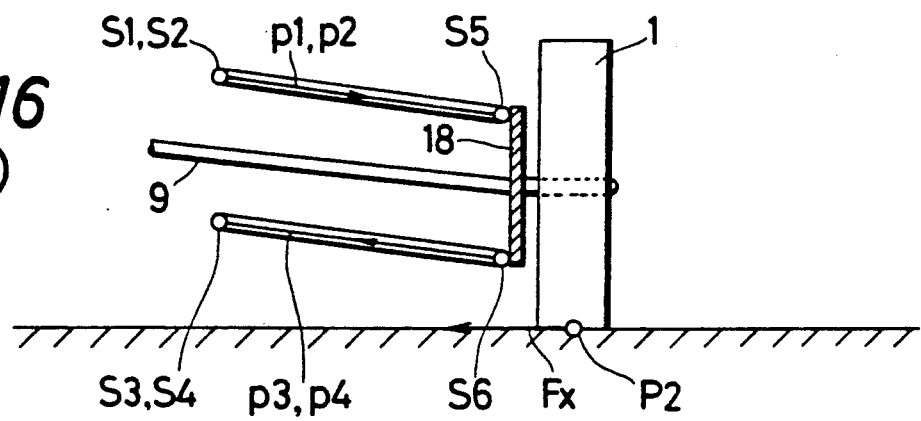
Fig.16 (1)
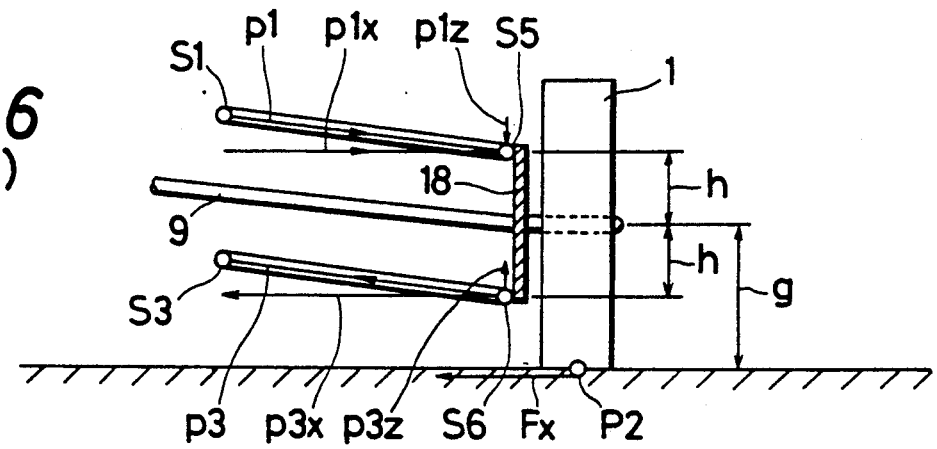
Fig.16 (2)
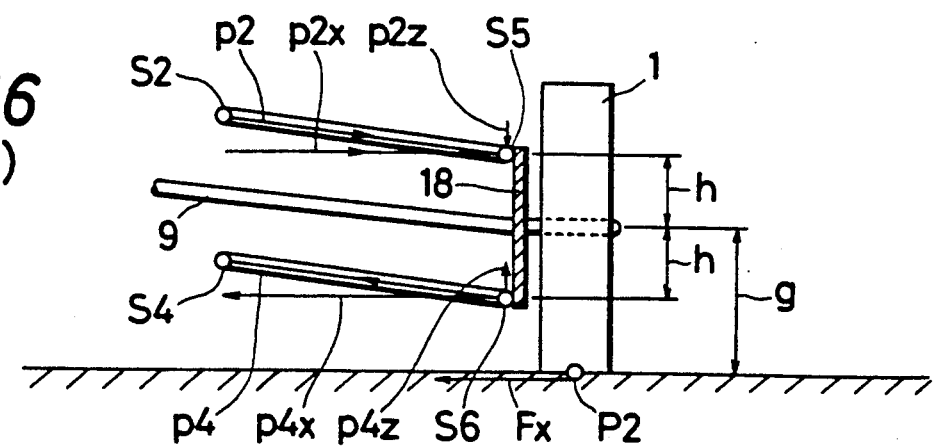
Fig.16 (3)

Fig.17 (1)
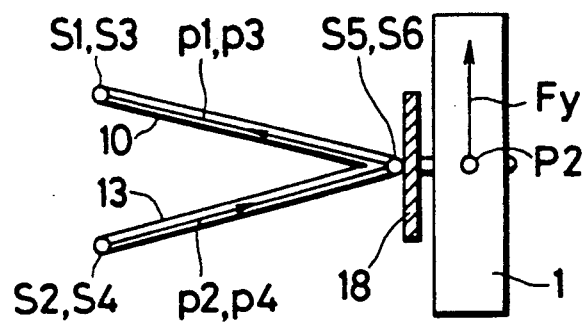
Fig.17 (2)
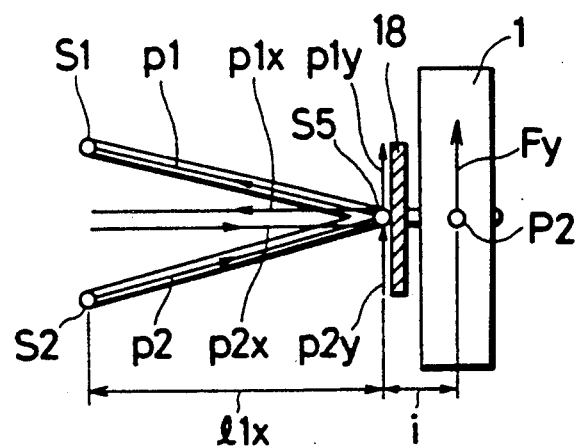
Fig.17 (3)
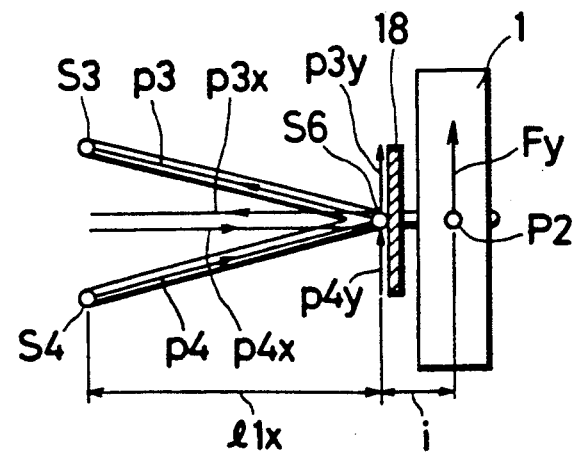

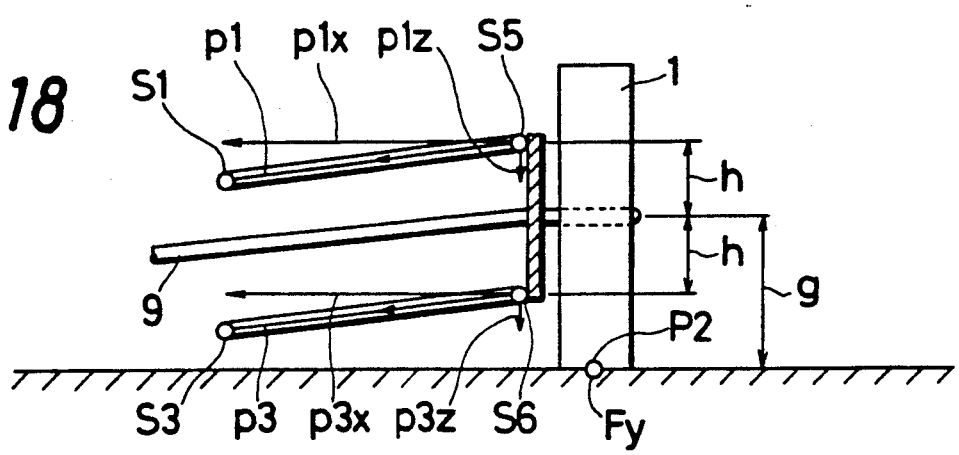
Fig.18 (1)
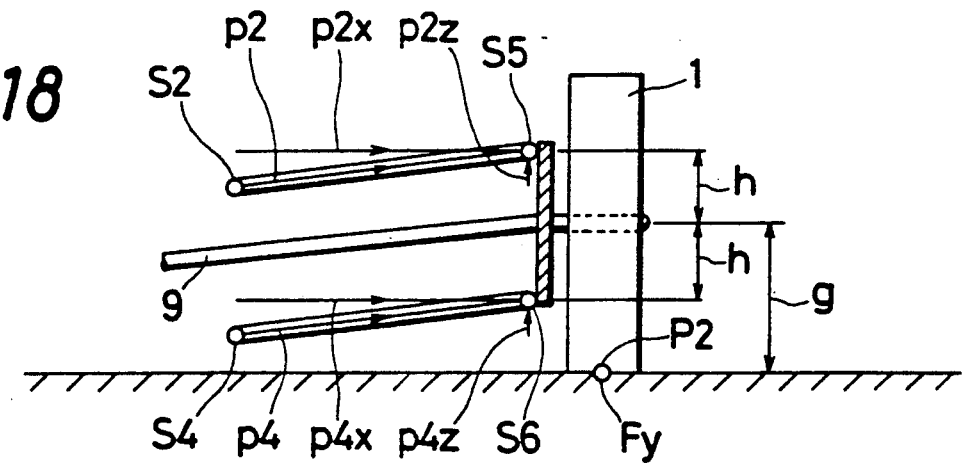
Fig.18 (2)

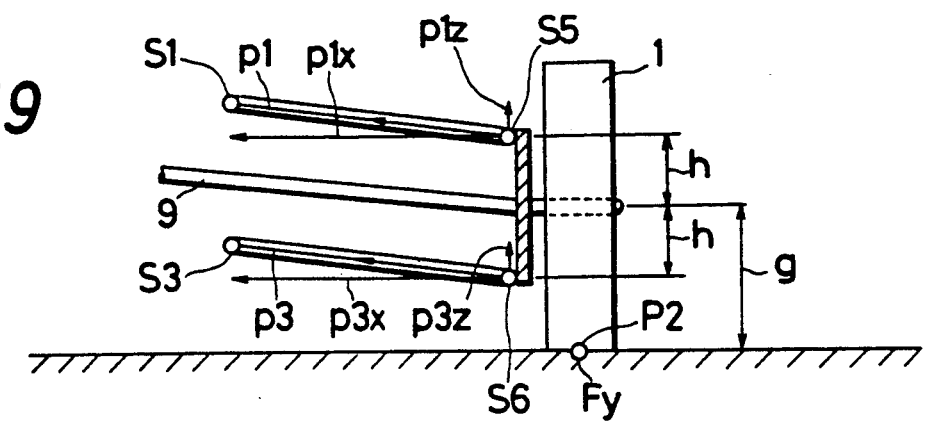
Fig.19 (1)
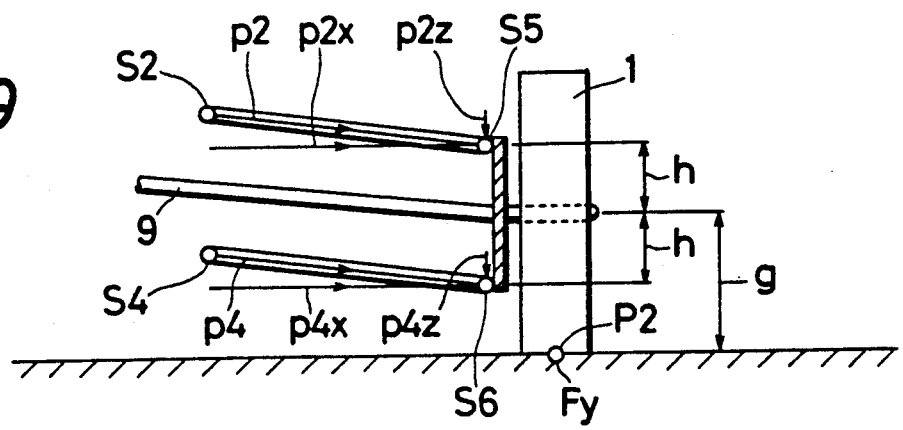
Fig.19 (2)

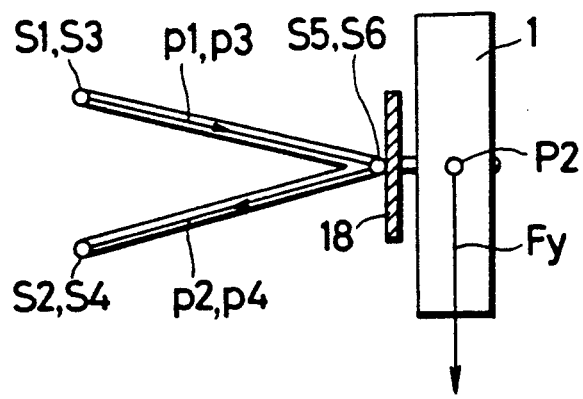
Fig.20 (1)
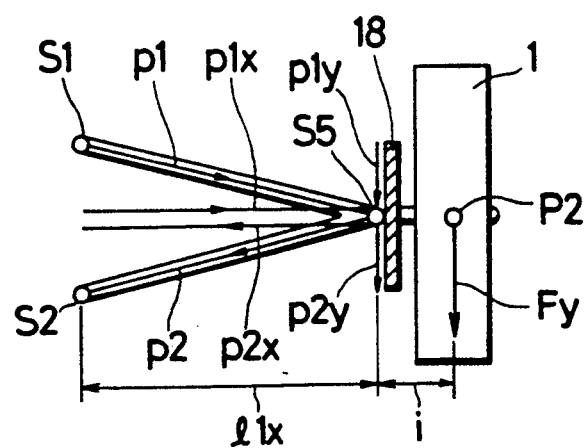
Fig.20 (2)
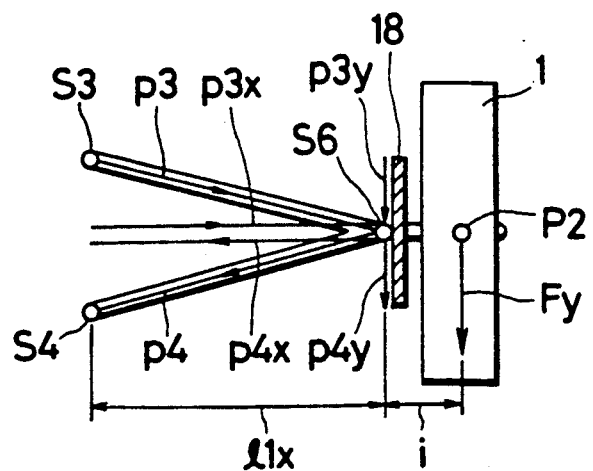
Fig.20 (3)

(1)

(2)

(1)

(2)

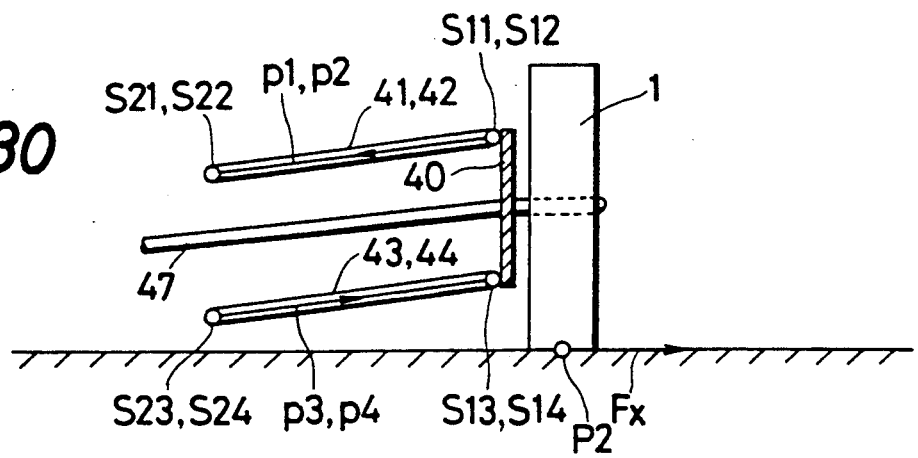
Fig.30 (1)
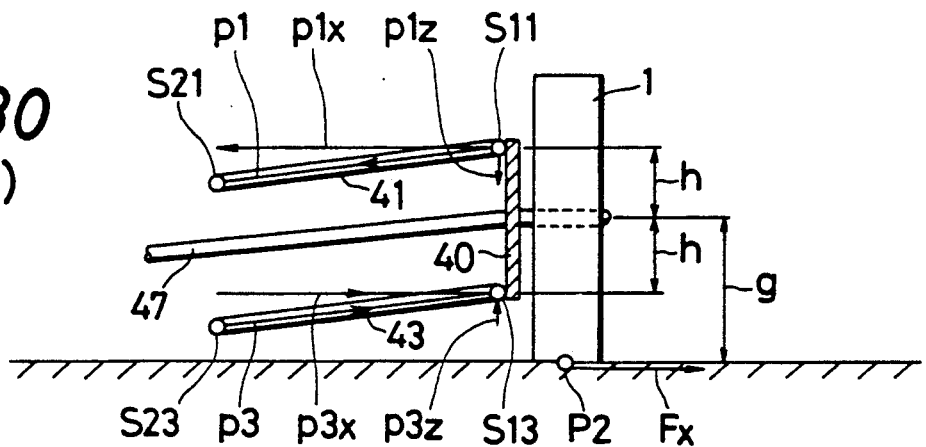
Fig.30 (2)
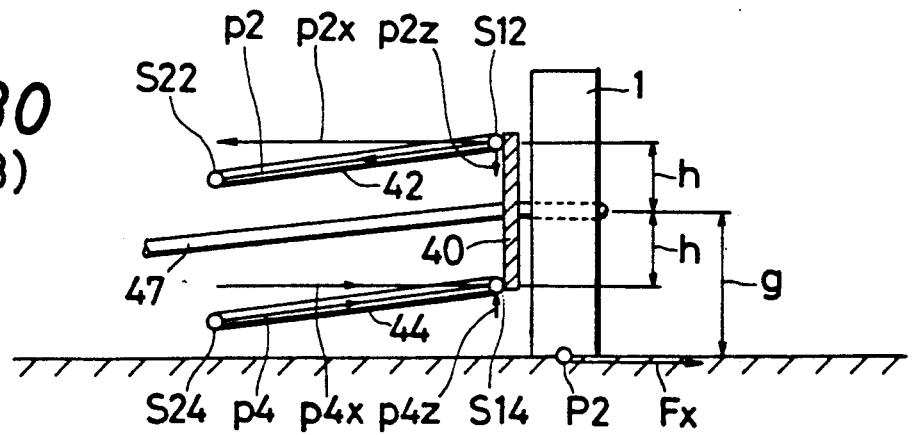
Fig.30 (3)

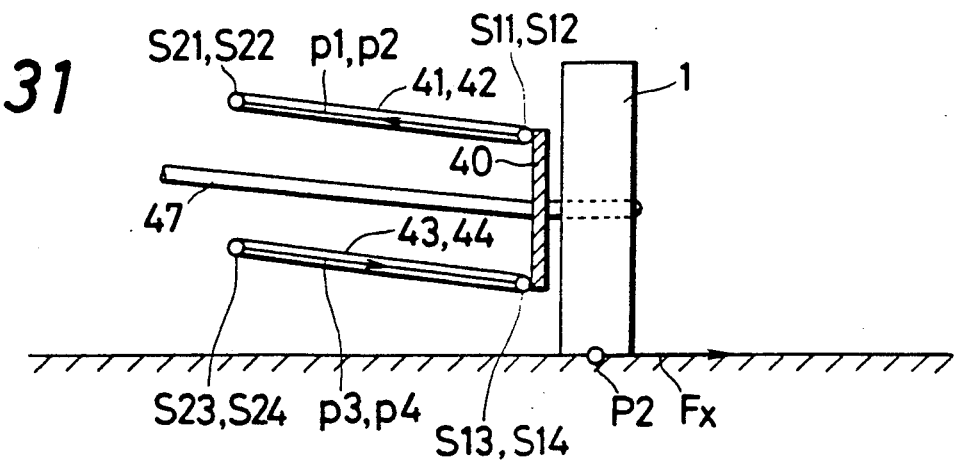
Fig.31 (1)
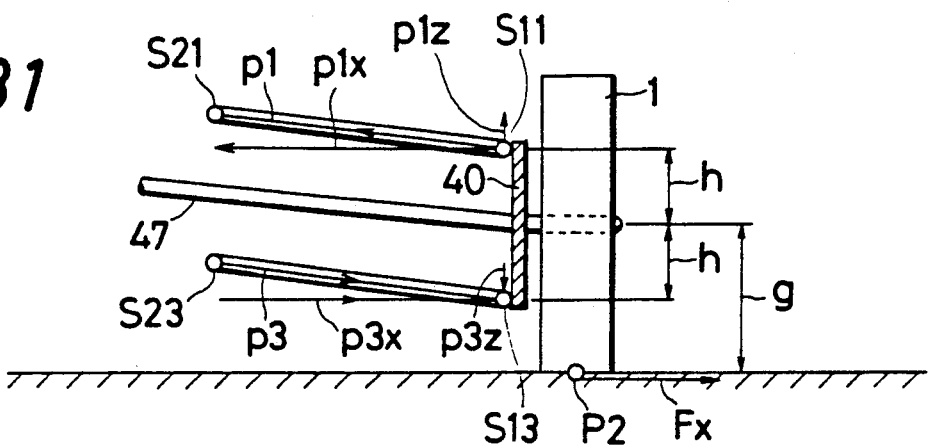
Fig.31 (2)
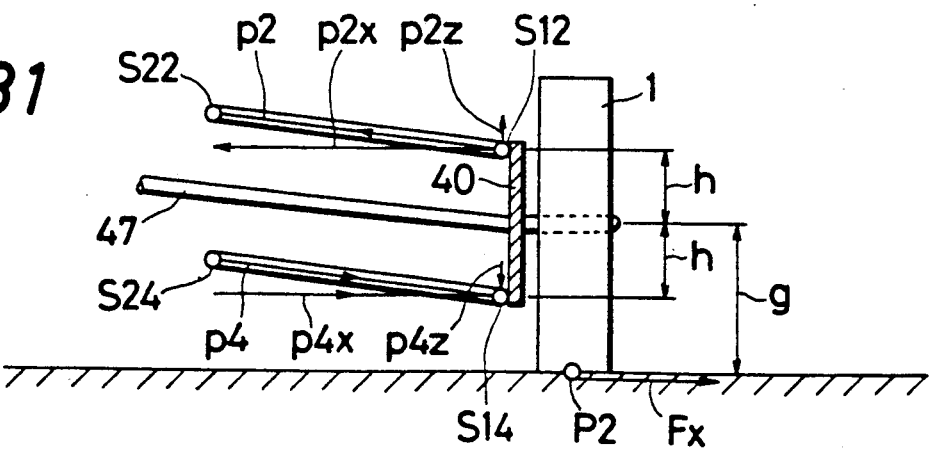
Fig.31 (3)

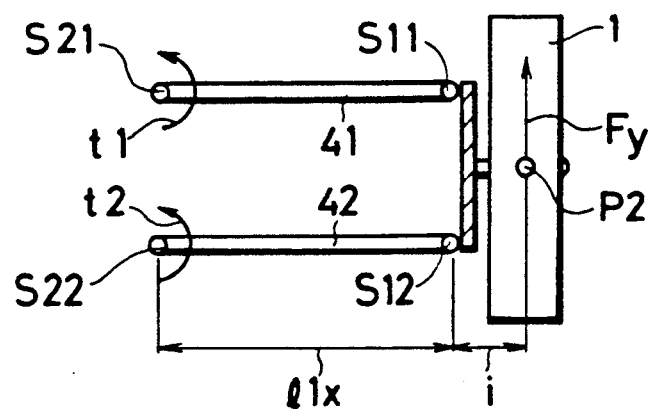
Fig.32 (1)
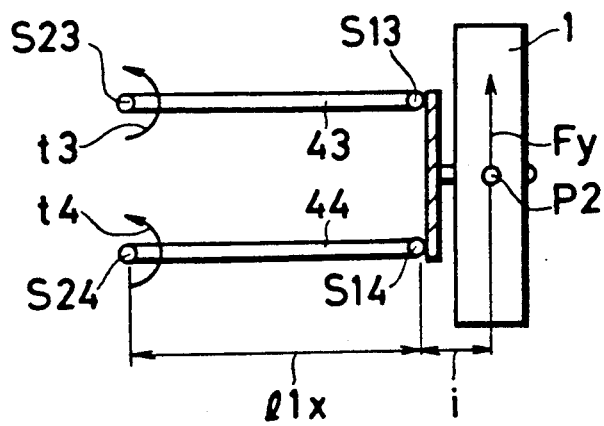
Fig 32 (2)

DRIVING CONTROL APPARATUS FOR AUTOMOBILE

BACKGROUND OF THE INVENTION

1. Field of the Invention

The present invention relates to a driving control apparatus of an automobile and, in particular, to a apparatus for controlling the steering angle, braking force and driving force of each wheel so as to improve the stability in driving of the automobile.

2. Description of the Prior Art

Conventionally, there has been a strong cry for an automobile with improved driving stability for safe driving. For instance, when an automobile is turning at an extremely low speed, the front wheels are steered corresponding to the driver steering angle of the steering wheel. The vehicle turns according to the angle of the front wheels as thus steered. In such a state of turning while traveling, the direction of the steered wheels roughly agrees with the wheels' traveling direction and turning of the vehicle can be done stably. However, when turning is done with the vehicle's speed high and the centrifugal force acting on the vehicle is accordingly high, and vice versa, or with a driving force or braking force acting in the event of a sudden acceleration, or deceleration respectively, the steering direction of the wheels is markedly deviated from the traveling direction thereof, and the vehicle cannot travel in the direction attempted by the driver.

Hence, there was a problem of loss of traveling stability when a sudden turning was made as well as in the event of a sudden acceleration or deceleration made while doing a normal turning.

However, conventionally, there has been no known technique for solving such a problem. Hence, with a conventional 4-wheel steering vehicle an attempt is made to improving the traveling stability by detecting the handling steering angle of the steering wheel with an angle detector attached to the revolving shaft of the steering wheel so that proper control is made on the basis of the signals transmitted by the aforementioned detector. With a 4-wheel steering vehicle which requires complicated control, such arrangements are made for proper control as providing the speedometer with a speed detector, providing a lateral accerometer near the vehicle's center of gravity for detecting (determining) the magnitude of centrifugal force acting on the vehicle's center of gravity or providing a yaw-gyro detector near the center of gravity for detecting the magnitude of yawing (moment), and having the handling steering angle of the steering wheel controlled according to the detection signals from the speedometer, lateral accerometer and yaw-gyro detector.

Another problem is inability to generate the component for each wheel of the centripetal force corresponding to the centrifugal force acting on the vehicle due to skidding of its wheels, this resulting in deterioration of the vehicle's traveling stability. In order to solve this problem, known control devices of the skid control type are so designed that the braking force or the driving force of the skidding wheel is weakened to prevent skidding. The judgment whether a wheel is skidding or not is done by providing each wheel with a number-of-revolutions detector for detecting the number of revolutions per unit length of time and determining the mean number of wheel revolutions from that of each of the 4 wheels and, if the number of revolutions of any of the 4 wheels should be markedly different from the mean number of wheel revolutions, that is, if the number of revolutions of any braking wheel is lower than that of the mean number of revolutions, it is judged that the particular wheel is skidding.

The aforementioned skid control consists in controlling each tire not to unduly skid and expecting that the natural capability of the tire generates a proper cornering force and is not of the nature to positively control the traveling direction of each wheel. Such skid control is feasible with the aforementioned 4-wheel steering vehicle, indeed, but even in such prior art there are influences of other various factors involved and the optimum steering direction with the deviation of wheel's traveling direction taken into due consideration cannot be determined. As such influences are cited, among others, (a) influence of the tire, that is, change of grip performance resulting from changing tires, of the pneumatic pressure, of the degree of tire wear and the tire temperature during traveling and of the balance of the individual wheels with their tire grips dependent thereupon, (b) influence by the vehicle's conditions such as the condition of suspension and shifting of the center of gravity during traveling, (c) influence by the aerodynamic force, that is, how strong an aerodynamic force is acting on what part of the traveling vehicle and in what direction, (d) influence by the road conditions, that is, by the change in friction coefficient between the tire of each of the 4 wheels et cetera, and all these influences, (a)-(d), have to be taken into due consideration. These influences, (a)-(d), all influence the traveling stability of the vehicle, but it is difficult to detect, compute and control all of them. Accurate and simple control with all the aforementioned factors, (a)-(d), influencing the traveling stability is feasible by detecting the traveling direction of each wheel and determining its deviation from the steering direction.

SUMMARY OF THE INVENTION

It is the object of the invention to provide a driving control apparatus for an automobile so designed that it detects the direction of the resultant force acting on each wheel, controls the steering angle of and braking force or driving force acting on each wheel to agree with the traveling direction and turning radius desired by the driver so as to improve the vehicle's traveling stability, at the same time enabling controlling the attitude angle during turning within a given range.

For accomplishing the above object, the invention provides a driving control apparatus for an automobile comprising:

first detection means for detecting directions of resultant force resulting from acceleration of a car body acting on each of wheels;

second detecting means for detecting traveling direction and turning radius desired by a driver;

means for controlling steering angle of each of the wheels in relation to outputs of the first and second detection means;

means for controlling braking force or driving force in relation to the outputs of the first and second detection means in turning state; and means for controlling the steering angle of each of the wheels and braking force or driving force acting on each of the wheels in response to the outputs of the first and second detection means so that the directions lines of the resultant forces of the wheels intersect at one point, and the point of intersection is positioned on a turning radius centered on a center of gravity of the car body detected by the second detection means.

According to the invention, the direction of the resultant force resulting from the car body's acceleration force acting on each wheel is detected by the first detection means, and the traveling direction and the turning radius desired by the driver are detected by the second detection means. The outputs detected by such first detection means and the second detection means are supplied to the means for controlling the steering angle and braking force or driving force of each of the wheels. While turning, the directions of the resultant forces of the wheels intersect at one point, and the point of intersection is so controlled that it is positioned on the turning radius centered on the center of gravity of the car body. The steering angle of each of the wheels is controlled by the steering angle control means for each wheel in relation to the output detected by the first and the second detection means, while the braking or driving force is controlled by the braking force or driving force controlling means in relation to the output detected by the first detection means and second detection means. Thus, the vehicle can be turned while traveling at the turning radius desired by the driver through control of the steering angle and the braking and driving force of each of the wheels, and thereby can improve the traveling stability of the vehicle.

According to the invention, the turning radius based on the output detected by the first detection means is so controlled that it is positioned on the turning radius determined on the second detection means, hence it is possible to drive the vehicle at the radius desired by the driver. The safety in traveling can, therefore, be improved, there is no risk of skidding and stable traveling can be accomplished. Also, the attitude angle during turning of the car body can be controlled.

In a preferred embodiment, the means for controlling the steering angle of each of the wheels and braking force or driving force acting of each of the wheels controls first the steering angle of each of the wheels and next controls the braking force or driving force.

In another preferred embodiment, the first detecting means is provided with means for detecting the extent of displacement of each of the wheels with respect to the road surface.

BRIEF DESCRIPTION OF THE INVENTION

The aforementioned and other objects, features and advantages will be further clarified from the detailed description under reference to the appended drawings, in which.

Figure 21:
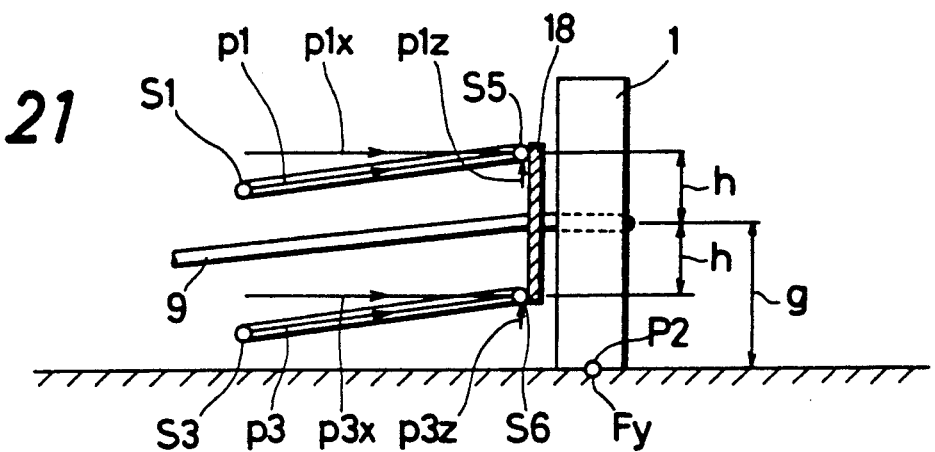
Figure 21:
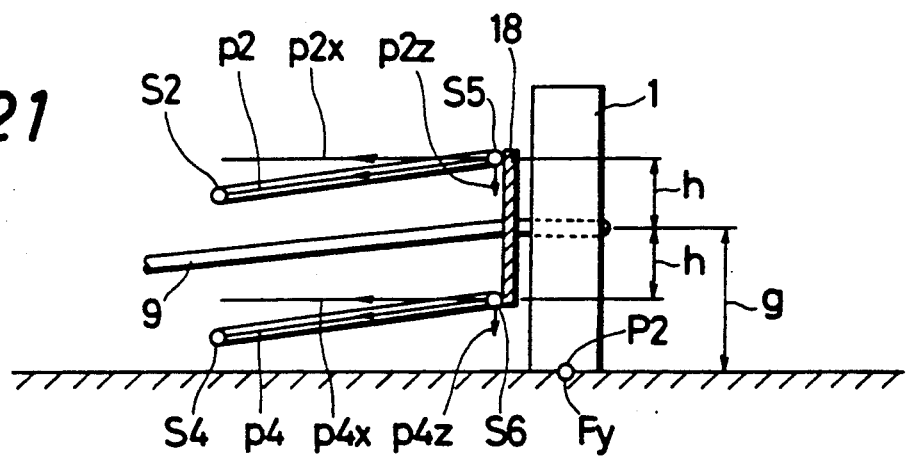
Figure 22:
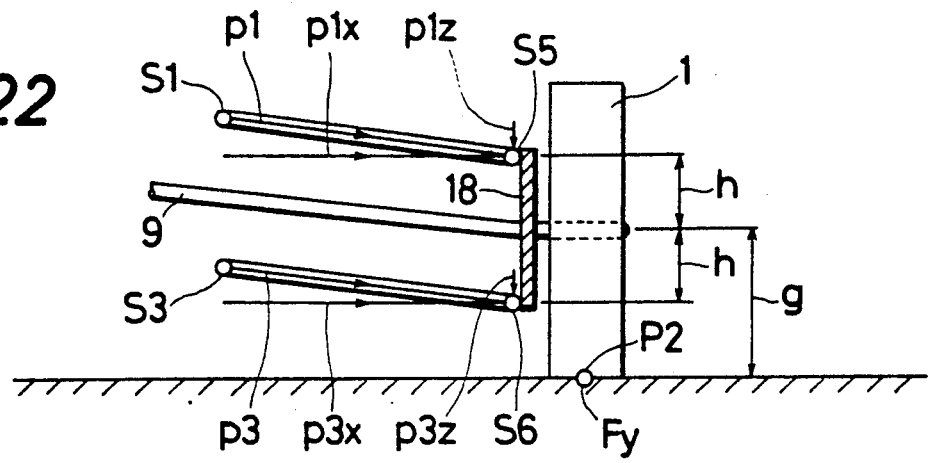
Figure 22:
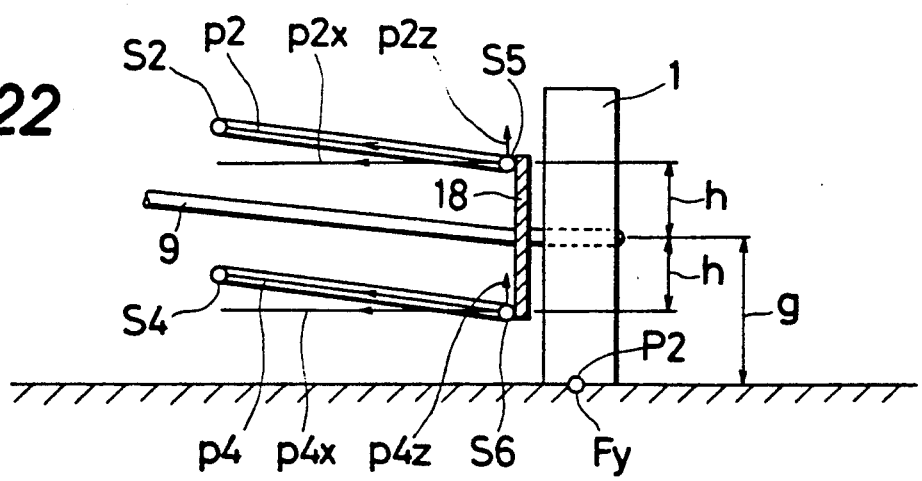
Figure 23:
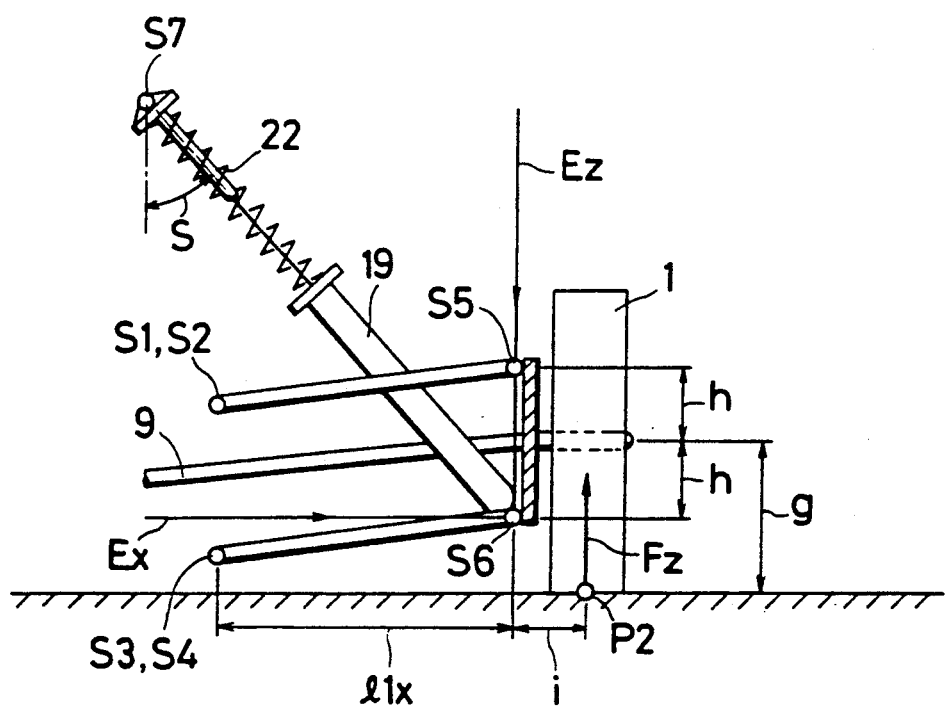
Figure 24:
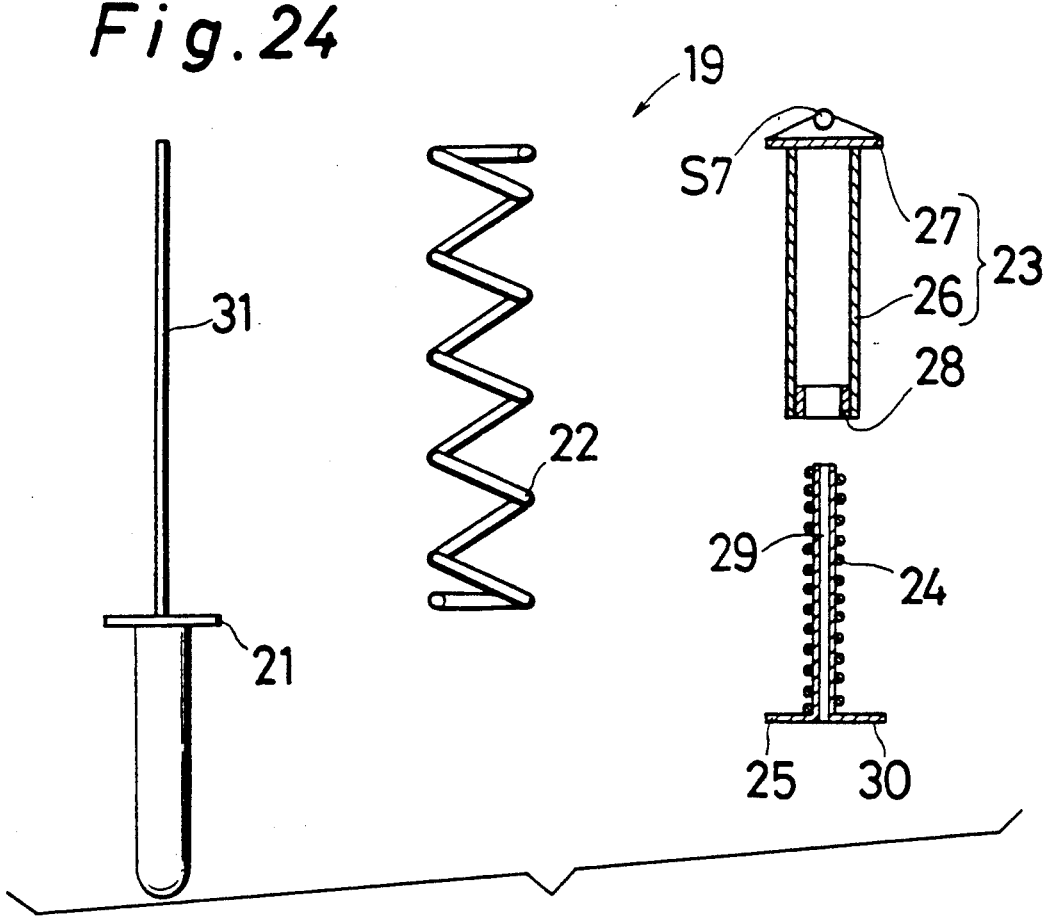
Figure 25:
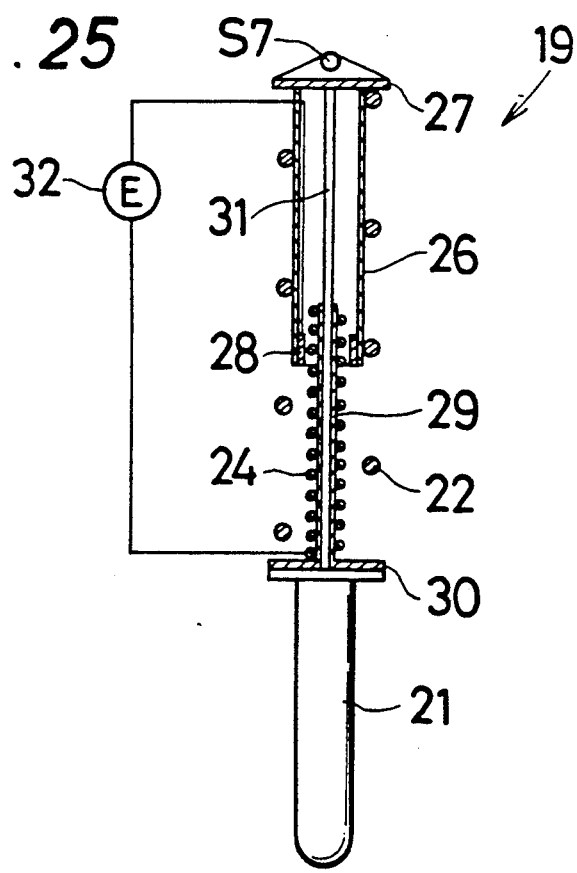
Figure 26:
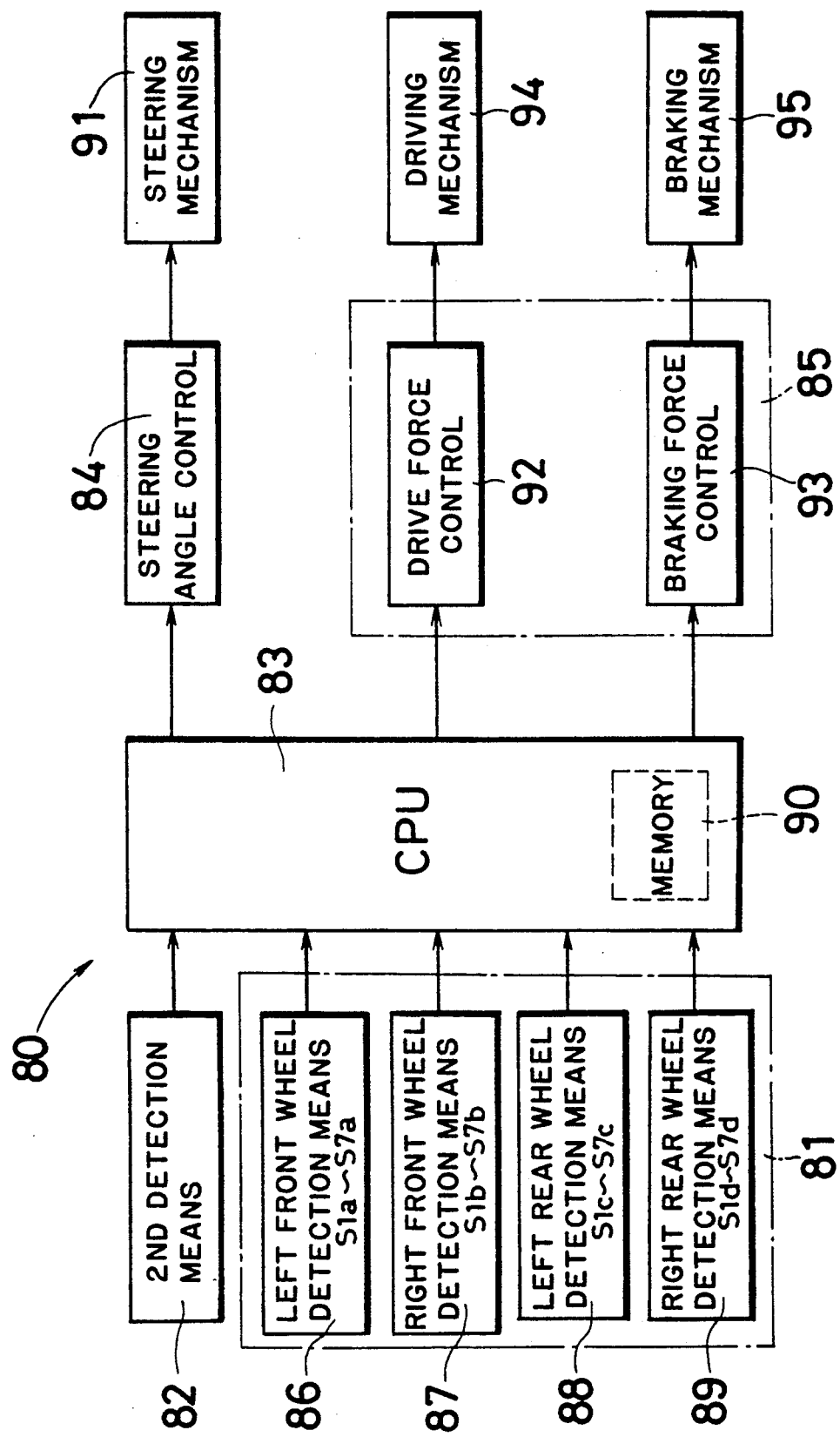
Figure 27:
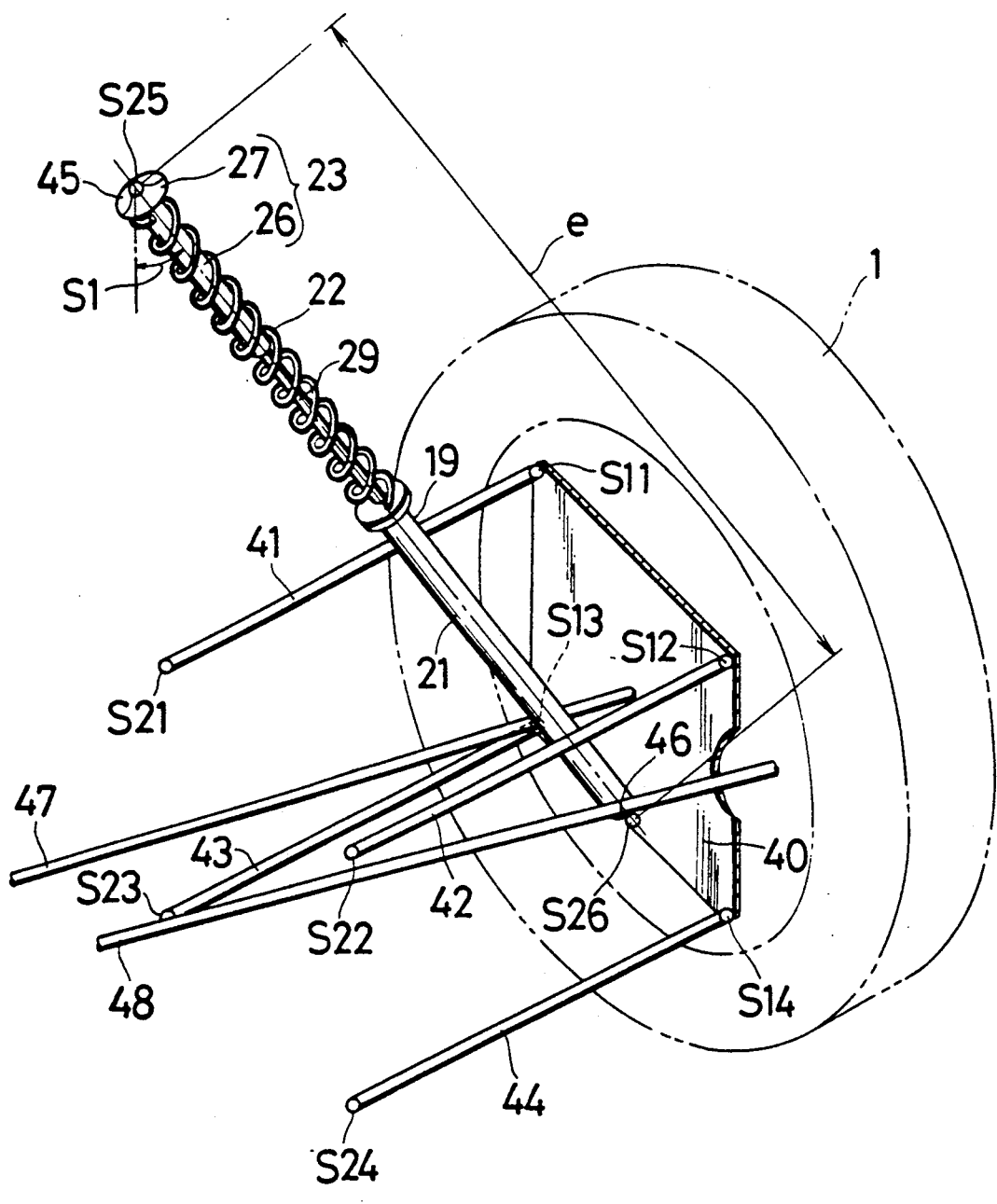
Figure 28:
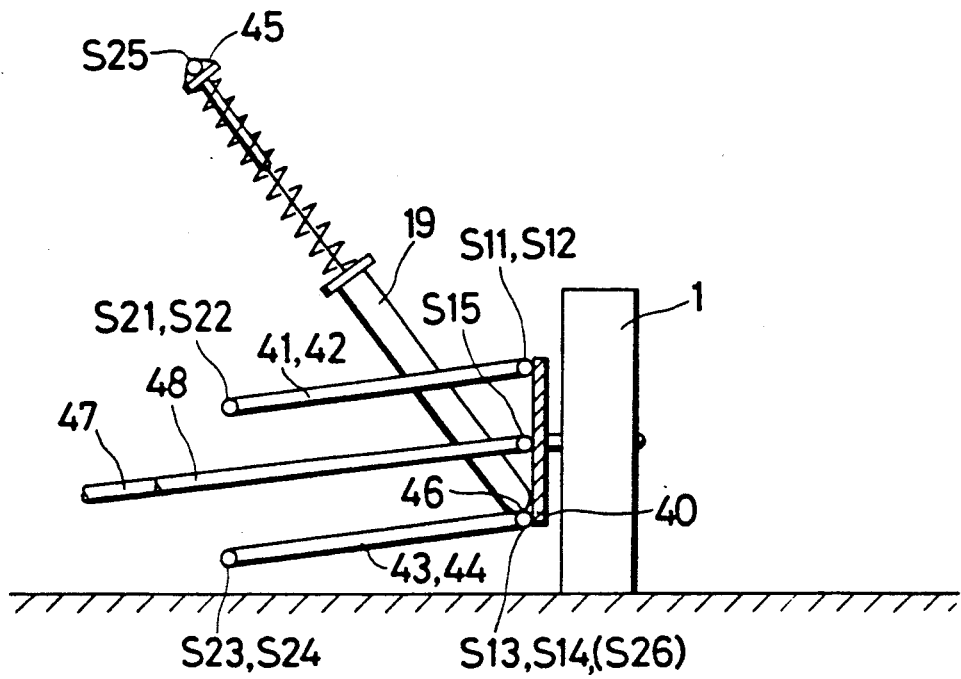
Figure 29:
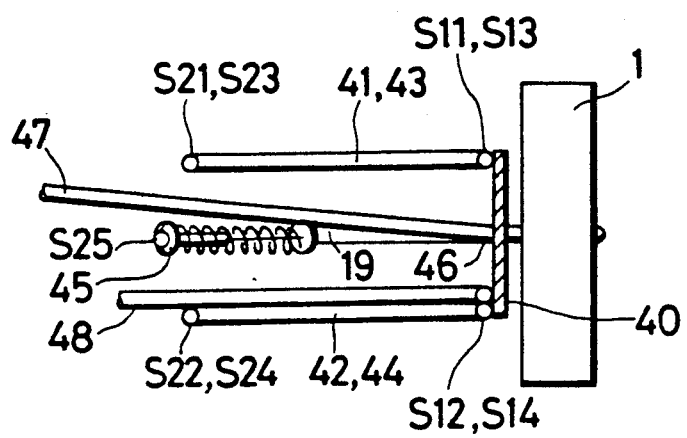
Figure 33:
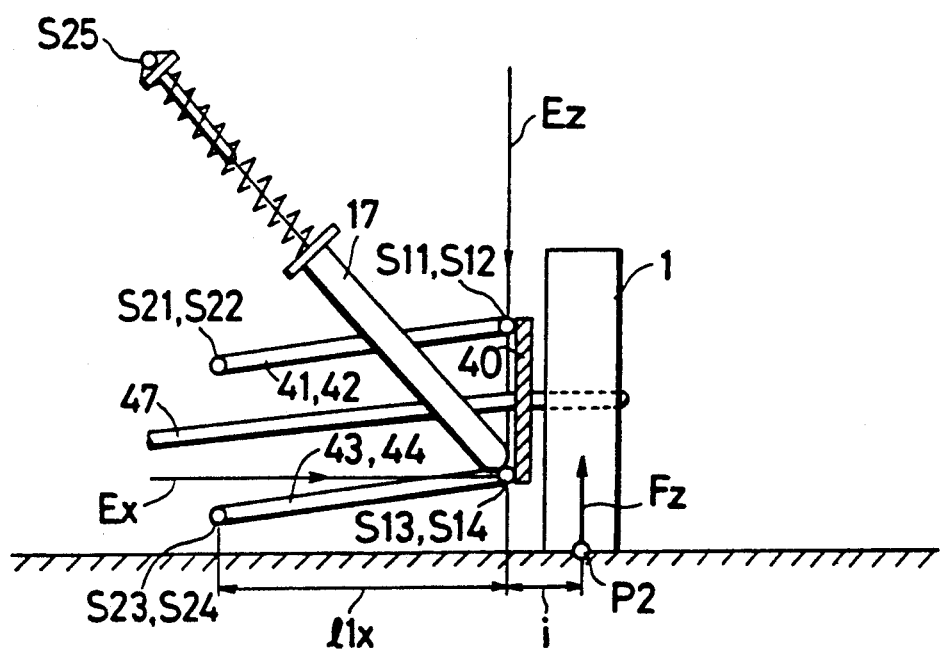
Figure 34:
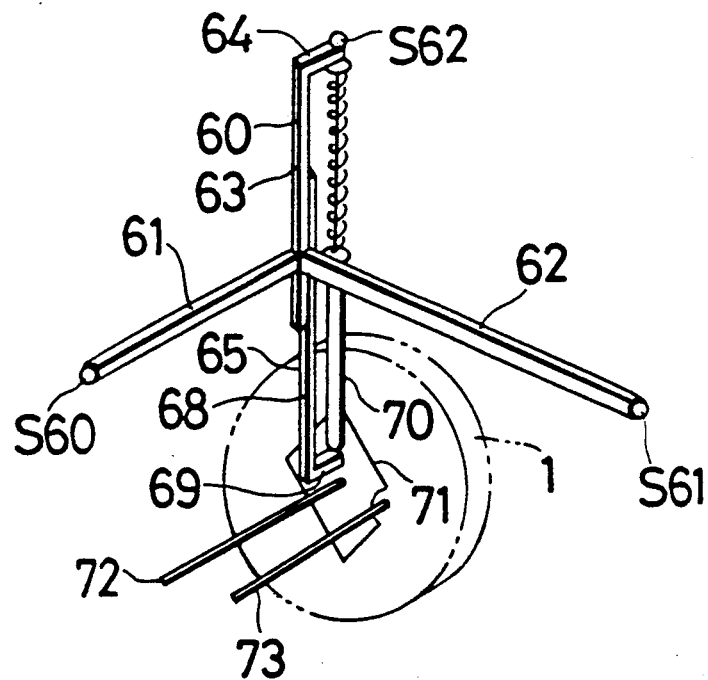
Figure 35:
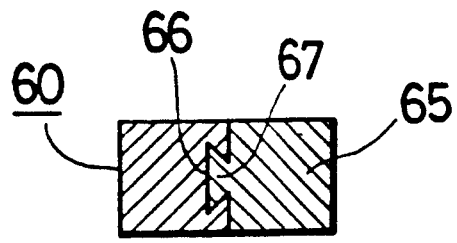
Figure 36:
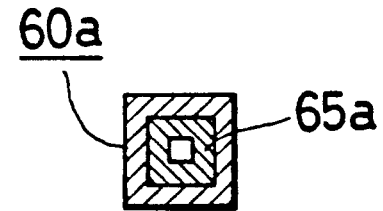
Figure 37:
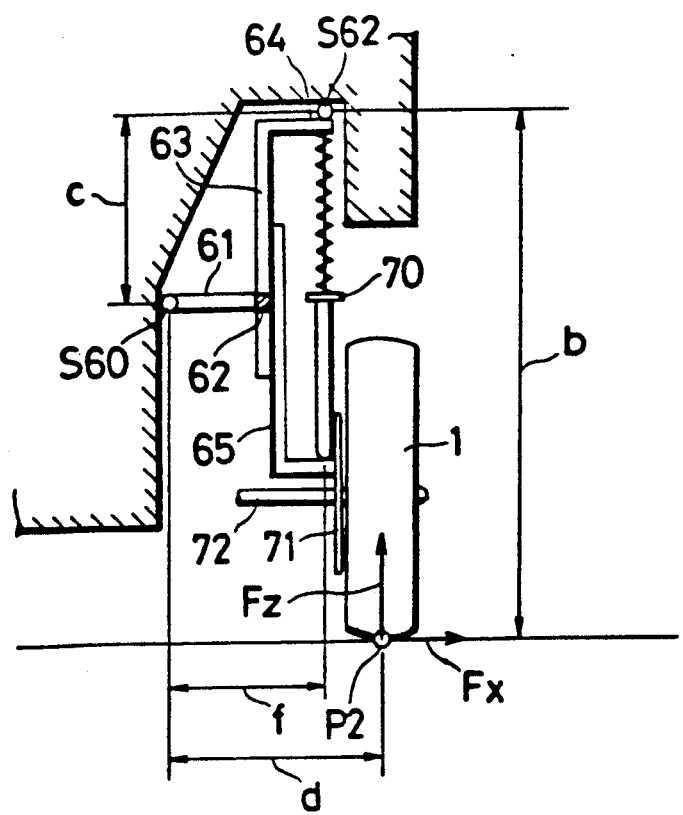
Figure 38:
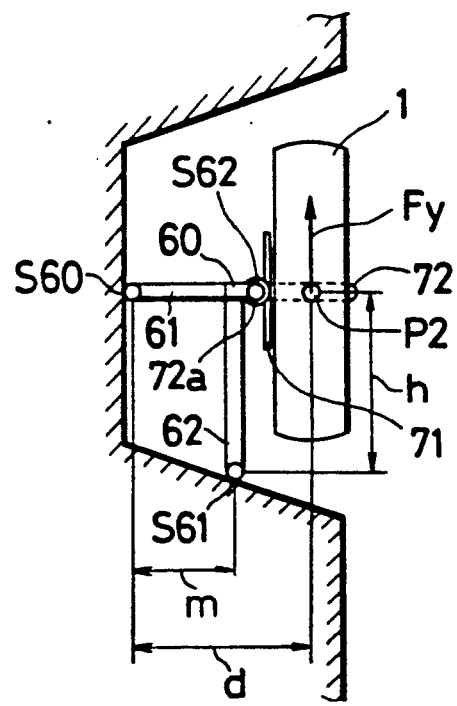

FIG. 13 (1)–(3) are views showing when the wheel 1 has bumped;

FIG. 14 (1)–(3) are views showing has rebounded;

FIG. 15 (1)–(3) are views showing when the wheel 1 has bumped;

FIG. 16 (1)–(3) are views showing when the wheel 1 has rebounded;

FIG. 17 (1)–(3) are views showing the state when the forward component force Fy is acting along X-direction on the point of application P2;

FIG. 18 (1) and (2) are views showing when the wheel 1 has bumped;

FIG. 19 (1) and (2) are views when the wheel 1 has rebound;

FIGS. 20–22 are views showing the state in which the component force Fy is acting rearward along Y-direction on the point of application P2 in FIGS. 17–19;

FIG. 23 is a view showing the state in which the component force Fz is acting upwardly along the Z-direction on the point of application P2 of the wheel 1;

FIG. 24 (1)–(3) are schematic views of a damper 19 including a dimensions-measuring detector in the disassembled form;

FIG. 25 is a sectional view of the assembled damper 19;

FIG. 26 is a block diagram showing the basic composition of an automobile steering control device 80 of the invention;

FIG. 27 is a schematic view showing another embodiment of the invention;

FIG. 28 is a side view of the wheel 1 viewed from behind the car body;

FIG. 29 is a plan view of the wheel 1 viewed from above the car body;

FIG. 30 (1)–(3) are views showing the state when the wheel 1 has bumped;

FIG. 31 (1)–(3) are views showing the state when the wheel 1 has rebounded;

FIG. 32 (1) and (2) are views showing the state with the component force Fy acting forward on the point of application P2;

FIG. 33 is a view showing the state with the component force Fz acting upward along Z-direction on the point of application P2 of the wheel 1;

FIG. 34 is a schematic view showing still another embodiment of the invention;

FIG. 35 is a sectional view of a supporting axis 60;

FIG. 36 is a sectional view of a supporting axis 60a;

FIG. 37 is a view showing the state with the component force Fx along X-direction and the component force Fz along Z-direction acting on the point of application P2 of the wheel 1 respectively; and FIG. 38 is a view showing the state with the component force Fy along X-direction acting on the point of application P2 of the wheel 1.

DESCRIPTION OF THE PREFERRED EMBODIMENTS

Figure 1:
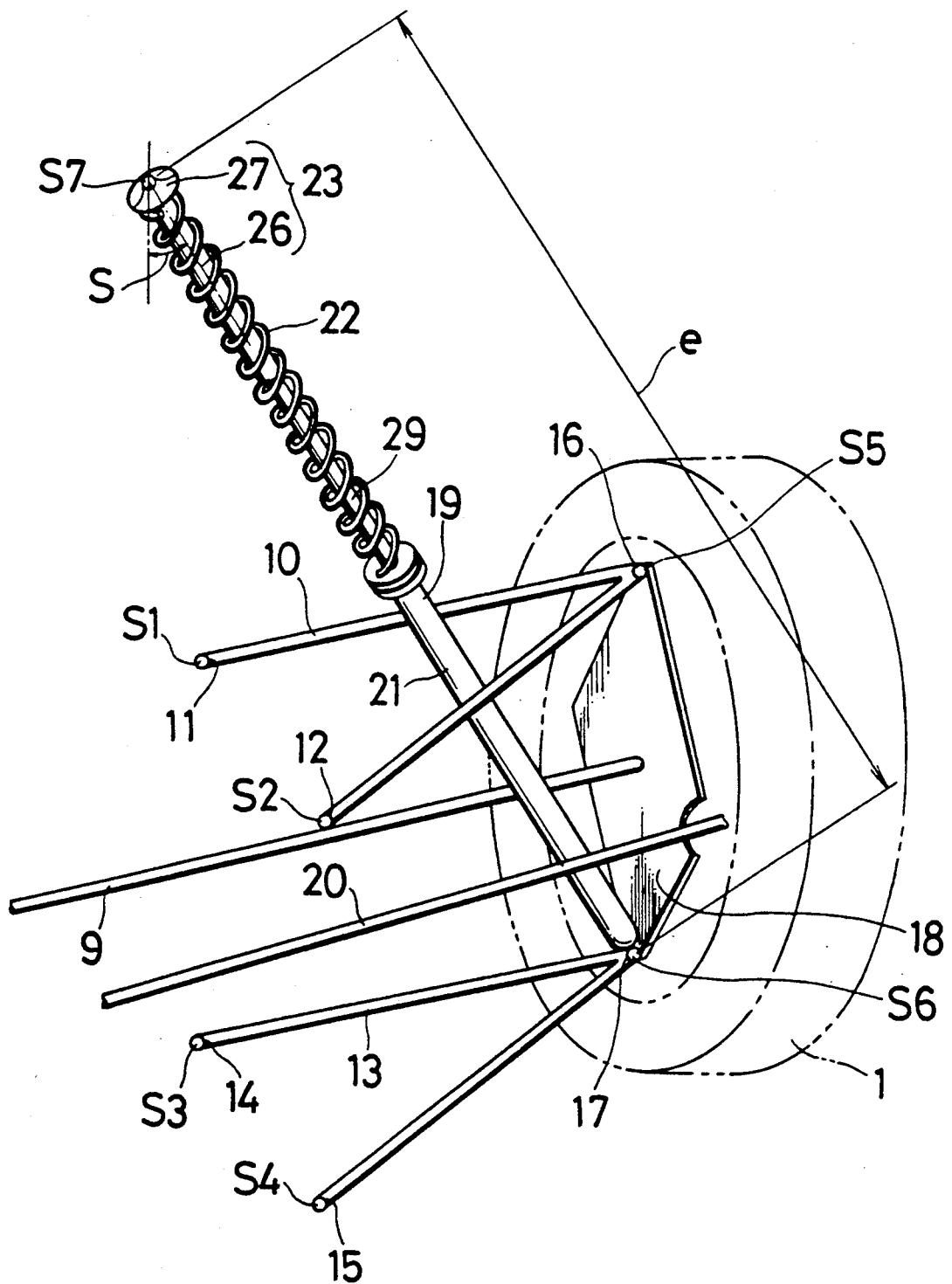
FIG. 1 is a schematic view of an embodiment of the invention.
Figure 2:
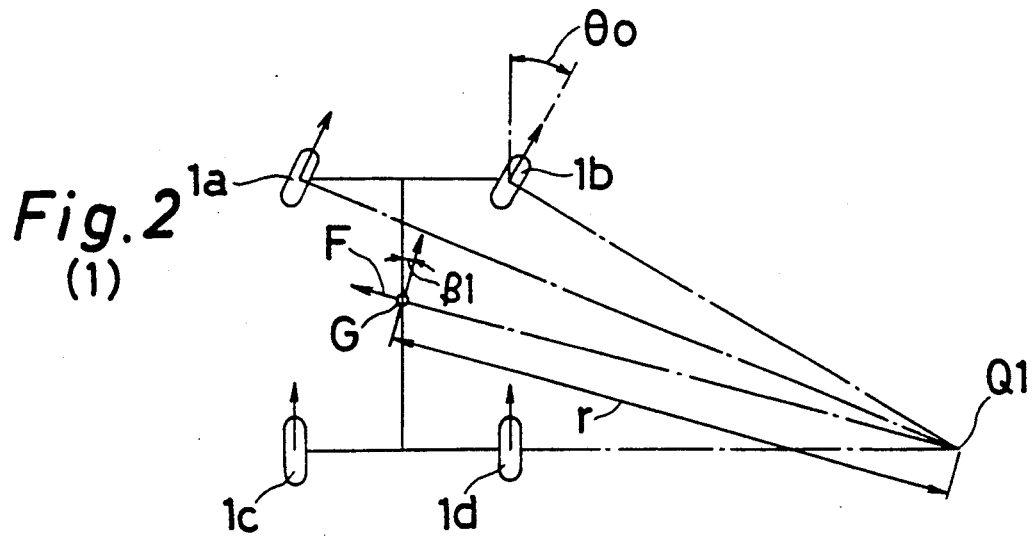
FIG. 2 is a view for illustrating a traveling direction of a turning vehicle.
Figure 2:
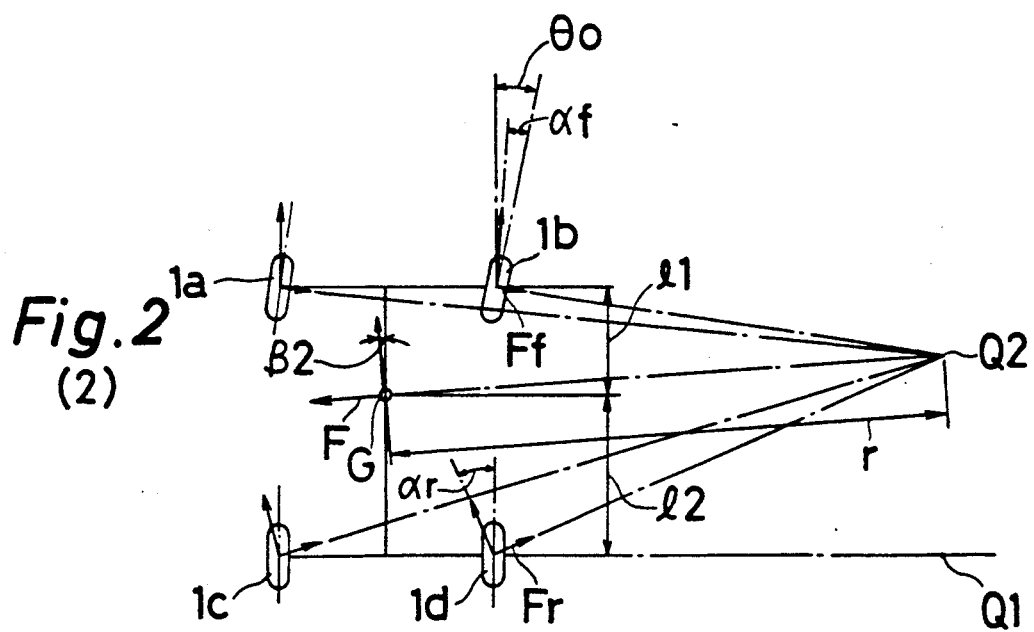
Figure 3:
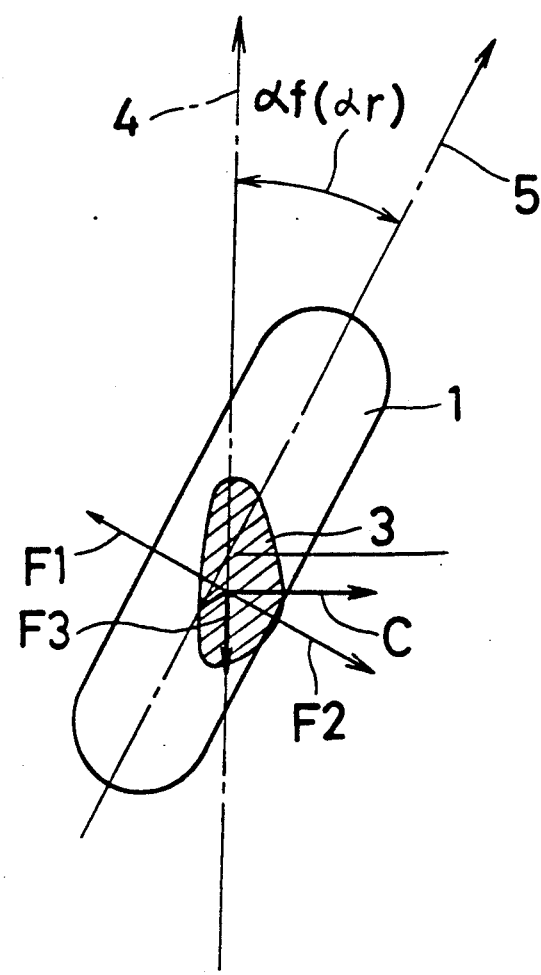
FIG. 3 is a view illustrating the traveling directions of wheels 1a, 1b, 1c and 1d of a turning vehicle.

FIG. 1 is a schematic view showing an embodiment of the invention, FIG. 2 is a view for illustrating a traveling direction of a vehicle turning in traveling, and FIG. 3 is a view for illustrating the traveling directions of wheels 1a, 1b, 1c and 1d (hereinafter generally referred to as "wheel 1") of a turning vehicle. Generally, when the vehicle turns on a flat road surface, a centrifugal force F, which is determined by the vehicle's turning radius, traveling speed and weight, is acting on the center of gravity G. This centrifugal force F is represented by the formula (1).

$$F = W/g \times V^2/r \quad (1)$$

where:
W ; Weight of vehicle
V : Vehicle's traveling speed
r ; Turning radius
g ; Gravitational acceleration Hence, on a vehicle of weight W there acts a centrifugal F which is proportional to the square of its speed V and in inverse proportion to its turning radius r. For the vehicle subjected to such a centrifugal force F to keep turning, it is essential that a reaction force large enough to offset the centrifugal force F is acting on the vehicle, and this reaction force is created between the tire of each wheel 1 and the road surface.

As shown in FIG. 2 (1), when the vehicle is turning at an extremely low speed, the aforementioned centrifugal force F, too, is extremely small, hence the cornering center Q1 is in the vicinity of the point of intersection of the extended line of the axle for the rear wheel 1c and 1d and lines extended perpendicular to the front wheel 1a and 1b. Meanwhile, the traveling direction of the vehicle's center of gravity G has its attitude angle β1 against the longitudinal axis of the car body. Also, as shown in FIG. 2 (2), when the vehicle's speed V is high, the centrifugal force F acting on the vehicle, too, is bound to be large and the cornering center Q2 shifts to be in front of the extended line of the axle for the rear wheels 1c and 1d (upper in FIG. 2 (2)), and the attitude angle β2 is on the side opposite to the attitude angle β1 with respect to the vehicle's longitudinal axis. Such shifting forward of the cornering center Q2 is supposed to mean a sideways force acting on the turning wheel 1. Because of this sideways force the wheel 1 does not travel in the direction of the tire thereon, but in the direction off its center line by a skid angle of αf or α. And this deviation from the center line gives rise to the aforementioned reaction force.

To cope with the centrifugal force F, the rear wheels 1c, 1d need reaction force to skid Fr=l1/ (l1+l2) . F, and this gives rise to the skid angle αr corresponding to the reaction force Fr. Hence the rear wheels 1c, 1d travel in a direction αf of the car body's longitudinal axis. Similarly, the front wheels 1a, 1b, too, need a reaction force to skid Ff=l2/ (l1+l2)×F, and this gives rise to a skid angle αf, this resulting in travel of the front wheels 1a, 1b in a direction off the car body's longitudinal axis by θ0 (steering angle)−αf (skid angle). The point of intersection of the two lines perpendicular to the traveling directions of the front and rear wheels 1a-1d is the cornering center Q2.

Referring to FIG. 3, a centrifugal force F is always acting on any turning vehicle, and to continue turning, is required a centripetal force equivalent thereto. The wheel 1 of the traveling vehicle with such centripetal force acting thereon is subjected to a skidding force F1. With the vehicle turning the centrifugal force F acts on the car body as well as each wheel 1 and, of the centrifugal force F acting radially outward along the turning radius, the wheels 1 are subjected to the corresponding component force but the tires on the wheels 1 have their treads 3 (the shadowed part) immovable due to their friction against the road surface. This results in a gap between the turning direction, that is, traveling direction 4 of each wheel 1 and the direction 5 in which the tire is caused to travel. Each tire, then, turns in the direction αf (or αr) off the traveling direction of each wheel 1, hence the tires tread 3 is distorted sideways and a reaction force F2 required for elastically restoring it is given rise to in the direction opposite to the skidding force F1. This reaction force F2 can be resolved into a component F3 in the direction opposite to the traveling direction 4 of the wheel 1 and a component C in the direction perpendicular to the traveling direction 4. This component C is also called the whirling force or the cornering force.

Referring to FIG. 1, each of the aforementioned wheels 1 is mounted to the car body by means of an upper shaft 10 and a lower shaft 13. Ends 11, 12 of the V-shaped upper shaft 10 and ends 14, 15 of the lower shaft 13 are fixedly attached to the car body via pressure detectors S1, S2, S3, S4 (hereinafter called "detector") connected in between. The other ends 16, 17 of the upper shaft 10 and lower shaft 13 are attached to the mounting plate 18 via angle detectors S5, S6 respectively, and the wheel 1 is mounted to this mounting plate 18. Such upper shaft 10 and lower shaft 13 are arranged to be always parallel regardless of vertical displacement of the wheel 1.

One end 27 of a damper 19, provided with a compression spring 22 for dampening the vertical vibration of the wheel 1, is attached to the car body via a pressure and angle detector S7, while the other end thereof is attached to the lower end of the mounting plate 18 via the aforementioned angle detector S6. This damper 19 is at an angle S against the vertical line. A rod 20 is set through a mating hole in the mounting plate 18 and is attached to the non-rotating part of the braking device, while the driving shaft 9 is set through the mounting plate 18 and secured to the wheel 1. When the wheel 1 is not the driving wheel, it is not provided with the driving wheel. The rod 20 is connected with a driving cylinder (not shown) et cetera provided in connection with the steering mechanism, and it is so arranged that, when the mounting plate 18 is pushed by the rod 20, the wheel 1 turns to the left and, when it is pulled, the wheel 1 turns to the right. Thus, by providing the detectors S1–S7, it is possible to detect the components Fx, Fy, Fz in imaginary axes of the directions X, Y, Z mutually perpendicular and acting on the wheel 1, and determine the direction of the resultant force.

Figure 4:
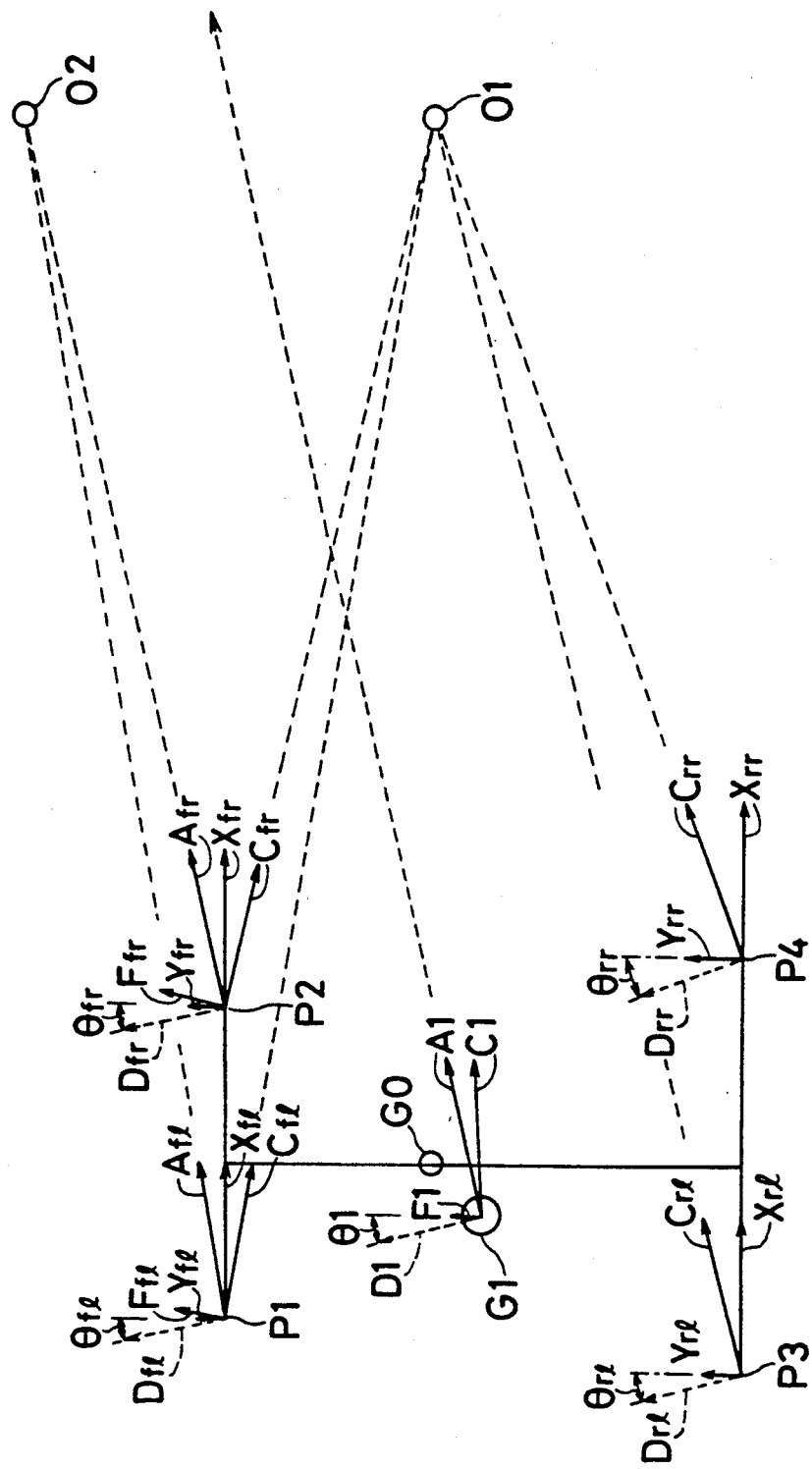
FIG. 4 is a view illustrating traveling of a front drive vehicle turning in acceleration.

FIG. 4 is a view for illustrating traveling of a front drive vehicle turning in acceleration. The tire point of application for the left front wheel 1a, right front wheel 1b, left rear wheel 1c and right rear wheel 1d are called P1, P2, P3 and P4 respectively, and the center of gravity of the vehicle parked on a level ground is called G0. When, for instance, turning is being made while traveling by inertia, that is, while turning is being made with the clutch off and not treading on the brake pedal, cornering forces Cfl, Cfr, Crl, Crr at the points of application P1, P2, P3, P4 are directed toward the cornering center 01 while traveling by inertia. The distance between the center of gravity G0 and the center of turning 01 is the actual turning radius, and it is controlled to equal the desired turning radius corresponding to the handling steering angle of the steering wheel manipulated by the driver.

The traveling direction of each wheel in turning while traveling by inertia is possibly perpendicular to the direction of the turning or cornering force, and at the points of application P1, P2, driving forces Ffl, Ffr are generated perpendicular to the direction of the cornering force. When the cornering force Cfl, driving force Ffl and cornering force Cfr and driving force Ffr are added, the resultant forces Afl and Afr are obtained respectively. Hence the individual component forces at the points of application P1, P2, P3, P4 are Afl, Afr, Crl, Crr respectively. The resultant forces Afl, Afr intersect, at the center point 02, while the directions of the cornering forces Crl, Crr are toward the center point 01. Such resultant forces Afl, Afr, Crl, Crr are determinable by means of the detectors S1-S7, as shown in FIG. 1.

The components in the sideway direction (X-direction) with respect to the ca body at the points of application P1, P2, P3, P4 are Xfl, Xfr, Xrl, Xrr respectively, while the components in the longitudinal direction with respect to the car body are Yfl, Yfr, Yrl, Yrr respectively. The traveling direction of each wheel is perpendicular to each wheel, that is, the directions indicated by reference symbols Dfl, Dfr, Drl, Drr for the points of application P1, P2, P3, P4, and these are at the angles $\theta fl$, $\theta fr$, $\theta rl$, $\theta rr$ against the longitudinal direction of each. In turning during acceleration traveling the center of gravity G0 is moved to a position showing by G1 due to shifting of the vehicle, and on this center of gravity G1 are acting the cornering force C1, driving force F1 and the resultant force A1 in turning while traveling by inertia.

Since the directions of the resultant forces Afl, Afr and whirling forces Crl and Crr at individual wheels do not intersect at one point, hence there exists no fixed cornering center, with this resulting in a lack of stability. In such a situation an apparent or imaginary cornering center where the directions of the resultant forces Afl, Afr and whirling, forces Crl, Crr for each wheel intersect is rather far off the direction of the resultant force A1. Thus, when the directions of the resultant forces Afl, Afr and whirling forces Crl, Crr for each wheel do not intersect at one point and the imaginary cornering center is further away than the turning radius desired by the driver (center point 01), it is said that the steering property is "under steer." Generally, the steering property of the front drive vehicle in turning while acceleration traveling is known to tend to be "under steer."

Described below are control means for solving the "under steer" steering property as mentioned above. A first control means proposed is to further increase the steering angle of the front wheel. By this the direction of the resultant forces Afl, Afr can be changed clockwise to some extent. That is, by further turning the front wheels clockwise the angle between the steering direction, Dfl, and the wheel's traveling direction, Dfr, that is, the skid angle $\alpha$ (See FIG. 3.) increases and, depending on the kind of tire mounted, the maximum cornering forces Cfl, Cfr are created, and the direction of the resultant forces Afl, Afr change clockwise. The wheels' traveling directions Dfl, Dfr are, however, not constant, changing slightly as the directions of the cornering forces Cfl, Cfr change. If the wheels are turned clockwise beyond a certain limit, however, the skid angle a which generates the maximum cornering force is exceeded, while cornering forces Cfl, Cfr are decreased, and the directions of the resultant forces Afl, Afr are inverted to change counterclockwise. Thus, when the steering property has fallen into a condition of "under steer", it is indeed possible to modify the under steer condition by turning the steering wheel further but if the steering wheel should be turned beyond a certain limit, the under steer condition is instead intensified. Hence it is then necessary to turn back the steering wheel until the disturbing condition is modified. For eliminating "under steer" by increasing the steering angle of the front wheels, therefore, it is essential to turn the directions of the resultant forces Afl, Afr clockwise to the limit and keep such condition thereafter.

A second control means consists in modifying the "under steer" condition in case of a 4-wheel steering vehicle by steering the rear wheels in the direction opposite to that of the front wheels, that is, by steering the former to the left. That is, when the steering direction for the rear wheels is changed to the left, the whirling forces Crl, Crr are reduced with decreasing angle between the wheel's steering direction, Drl, and the wheel's traveling direction, Drr, that is, the skidding angle a, with a resultant decrease of the cornering forces Crl, Crr. Then, to increase the cornering forces Crl, Crr to cope with the centrifugal force F acting on the car body, the traveling directions of the rear wheel Drl, Drr change counterclockwise and the once reduced skid angle $\alpha$ is restored to the optimum value and thereby optimizes the cornering forces for the rear wheels Crl, Crr.

If the aforementioned first and second control means should fail to improve the traveling stability, a third control means is conceivable. This third control means consists in weakening the driving forces Ffl, Ffr and thereby changing the directions of the resultant forces Ffl, Ffr clockwise. Such a mode of changing is known and used, for instance, in actual traveling tests or the like and, when the steering property of the front wheel drive vehicle has fallen into an "under steer" condition, there results the so-called tuck-in phenomenon in which decrease of the driving forces Ffl, Ffr results in modification of "under steer," and this phenomenon can be utilized for improving the traveling stability.

Figure 5:
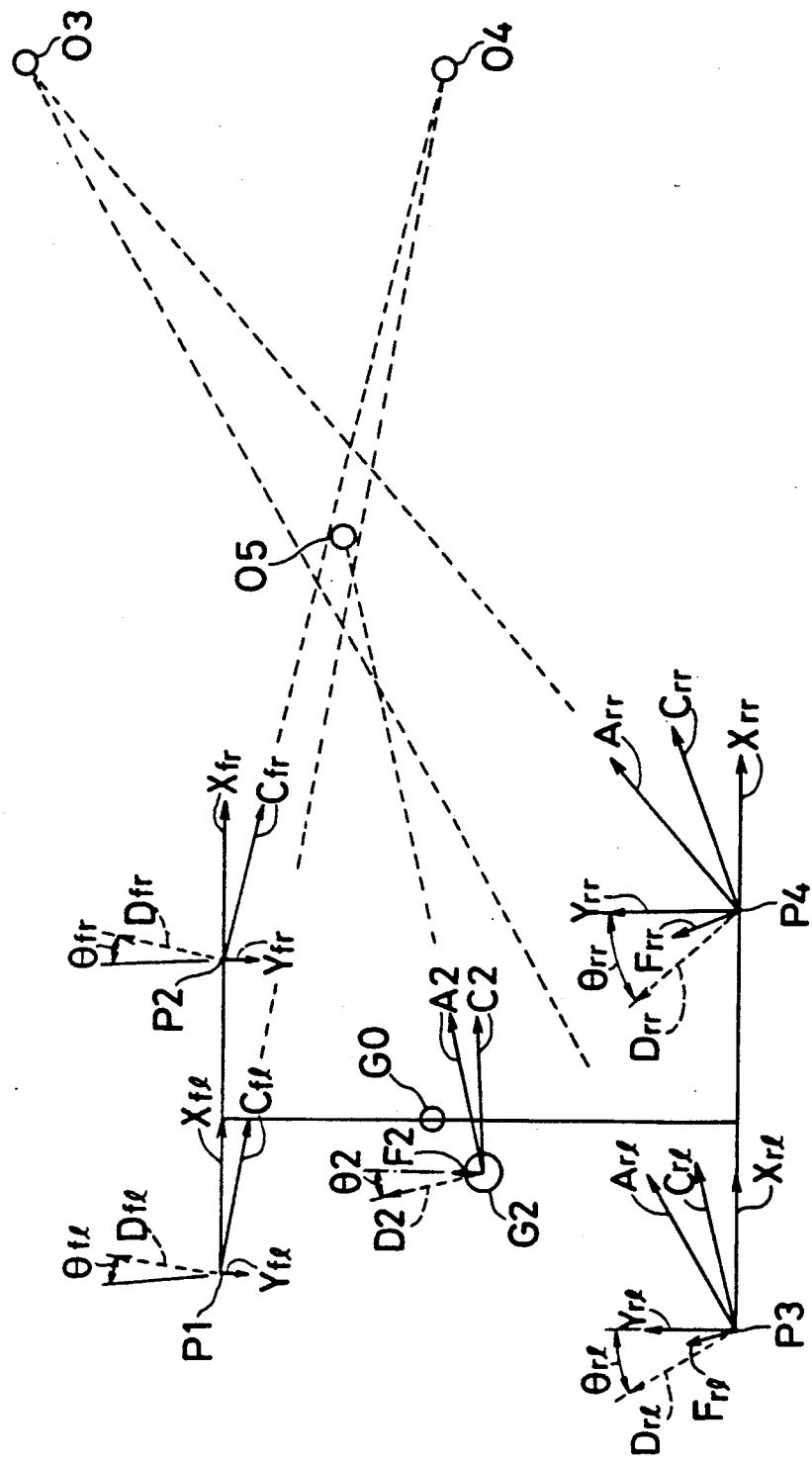
FIG. 5 is a view illustrating traveling of a rear drive vehicle turning in acceleration.

FIG. 5 is a view for illustrating traveling of a rear wheel drive vehicle turning in acceleration. Since the figure deals with the rear wheel drive vehicle turning in acceleration, the driving force does not act on the points of application P1, P2, and the points of application P3, P4 of the rear wheels have generated therein driving forces Frl, Frr perpendicular to the directions of cornering force Crl, Crr. If the turning force Crl and driving force Frl as well as cornering force Crr and driving force Frr are respective combined, the resultant forces Arl, Arr result. Hence, the cornering forces Cfl, Cfr and resultant forces Arl, Arr are acting on the points of application P1, P2, P3, P4 respectively. The directions of the resultant forces Arl, Arr are toward the center 03. Thus, since the directions of the whirling forces Cfl, Cfr and resultant forces Arl, Arr for each wheel do not intersect at one point, a fixed cornering center does not exist, traveling stability leaves something to be desired.

Under such conditions, the apparent or imaginary whirling center 05 is located near the point of intersection of the directions of the cornering forces Cfl, Cfr and resultant forces Arl, Arr for each wheel. Thus, when the directions of the cornering forces Cfl, Cfr and the resultant forces Arl, Arr do not intersect and the imaginary cornering center 05 is located nearer than the desired turning radius, it is said that the steering property is "over steer." It is generally known that with the rear wheel drive vehicles the steering property tends to be "over steer" when turning while accelerating. This is because the directions of the resultant forces Arl, Arr at the points of application P3, P4 are caused, by the driving forces Frl, Frr, to move off the center point 04 and more counterclockwise, and the imaginary cornering center 05 becomes shorter than the desired turning radius.

In order to improve the steering property and get rid of the state of "over steer" it is recommended to steer the front wheels, which were steered to the right as a step of the first control means, back to the left. By this, it is possible to change the directions of the cornering forces Cfl, Cfr counterclockwise. When the degree of "over steer" is small, such a control means alone is enough for turning with the steering property in "neutral steer." A "neutral steer" steering property is the state in which the directions of the resultant forces from the four wheels of the vehicle intersect at a point off the vehicle's center of gravity by the desired turning radius, which corresponds to the handling steering angle of the steering wheel.

It is, however, sometimes the case that the decrease of the skid angle αf of the front wheels due to the steering to the left of the front wheels causes the cornering forces Cfl, Cfr of the front wheels to decrease and this results in a loss of balance with the cornering forces Crl, Crr of the rear wheels and poor traveling stability. In such a case, it is possible to use the second-control means described above. This second control means consists of steering the rear wheels to the right to be in phase with the front wheels. It is thereby possible to change the directions of the resultant forces Arl, Arr clockwise. Such changes are the same as described above with reference to FIG. 4, hence further explanation is omitted here to avoid redundancy.

When a sufficient steering stability and "neutral steer" steering property cannot be obtained even by combined application of the first and the second control means, the third control means is applicable. This third control means consists in simply lowering the driving force Frl, Frr. By this the directions of the resultant forces Arl, Arr can be caused to change clockwise and control can be effected in the same way as the first control means described above with reference to FIG. 4.

Figure 6:
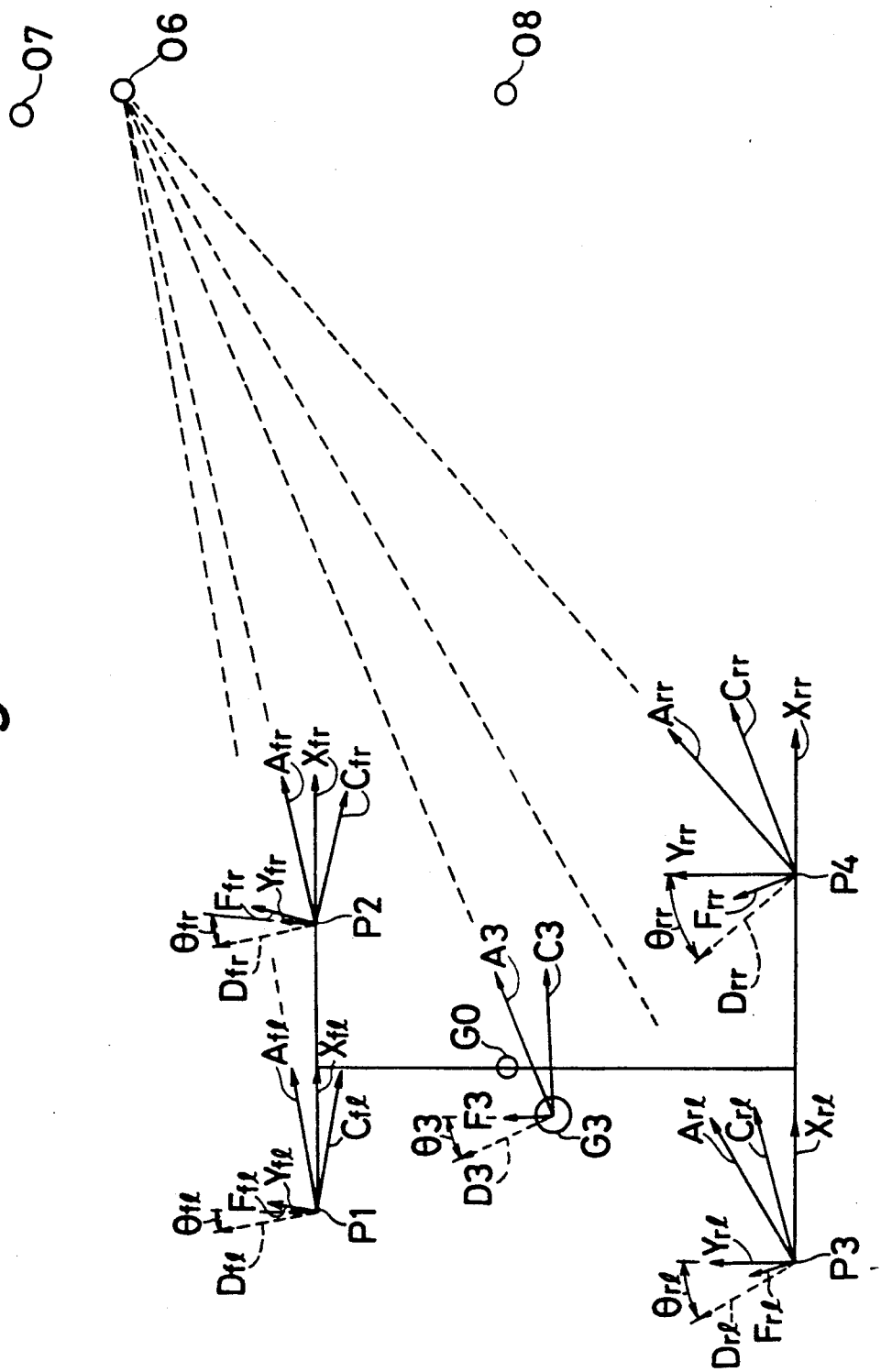
FIG. 6 is a view illustrating traveling of a 4-wheel drive vehicle turning in acceleration.

FIG. 6 is a view for illustrating traveling of a 4-wheel drive vehicle turning in accelerated traveling. When the driving forces Ffl, Ffr, Frl, Frr acting on each wheel are well balanced, the directions of the resultant forces Afl, Afr, Arl, Arr acting on each wheel intersect at the center point 06. Hence, with the 4-wheel drive vehicle, it is easier to attain a better steering stability and "neutral steer" steering property than with vehicles of other driving systems (front drive vehicle or rear drive vehicle), if care is only given to the balance between (among) the driving forces Ffl, Ffr, Frl, Frr on the individual wheels. The direction of the resultant force A3 acting on the center of gravity G3 is toward the center point 06, and the vehicle is turning in acceleration at an attitude angle of θ3 inward of the tangent to the locus of the turning vehicle. Such steering stability and "neutral steer" steering property of the 4-wheel drive vehicle are subject to influence by the driving force acting on each wheel and also vary depending on the steering angle of, and distribution of the driving force among, the individual wheels. The distribution of the driving force is a point requiring caution unlike that with front or rear drive vehicles, hence explained below is how the driving force is distributed among the individual wheels.

When the driving force components Ffl, Ffr, acting on the front wheels are made higher than the components Frl, Frr on the rear wheels, the direction of the resultant forces Afl, Afr are toward the center point 07, having moved counterclockwise from the center point 06 of the resultant force acting on the rear wheels, and the steering property is "under steer". Conversely when the driving force, components Frl, Frr force, acting on the rear wheels is higher than the driving force, components thereof Ffl, Ffr, acting on the front wheels, the direction of the resultant force Arl, Arr is toward the center point 07, moved counterclockwise from the center point 06, where the resultant forces acting on the front wheels intersect, hence its steering property is "over steer". Such "under steer" and "over steer" steering properties of the 4-wheel drive vehicle become similar to the steering property of the front drive vehicle when the proportions of the driving force distributed to the front wheels are increased, and similar to those of the rear drive vehicle when proportions thereof distributed to the rear wheels are increased.

A means for controlling the steering stability of such a 4-wheel drive vehicle to be "neutral steer" is therfore described. The first control means consists in changing the steering angle of the wheel, it being desired to change the directions of the resultant forces Afl, Afr, Arl, Arr of all wheels counterclockwise by steering the wheels to the left, and vice versa.

The means of control for changing the direction thereof clockwise is same as the first control means illustrated in FIG. 4 and the second control means illustrated in FIG. 5, and the control means for changing the same counterclockwise is the reversal thereof, being substantially similar to the second control means illustrated in FIG. 4 and the first control means illustrated in FIG. 5, hence further explanation ion is omitted.

The second control means consists in changing the direction of the resultant forces Afl, Afr, Arl, Arr of the individual wheels counterclockwise by increasing the driving forces Ffl, Ffr. Frl, Frr, and clockwise by decreasing same. This mode of control by increasing or decreasing the driving force is the same as adopted for the third control means shown in FIGS. 4 and 5. Such a control mean enables turning in acceleration at a small cornering attitude angle θ3 by controlling the center point 06 to agree with the center point 08.

Figure 7:
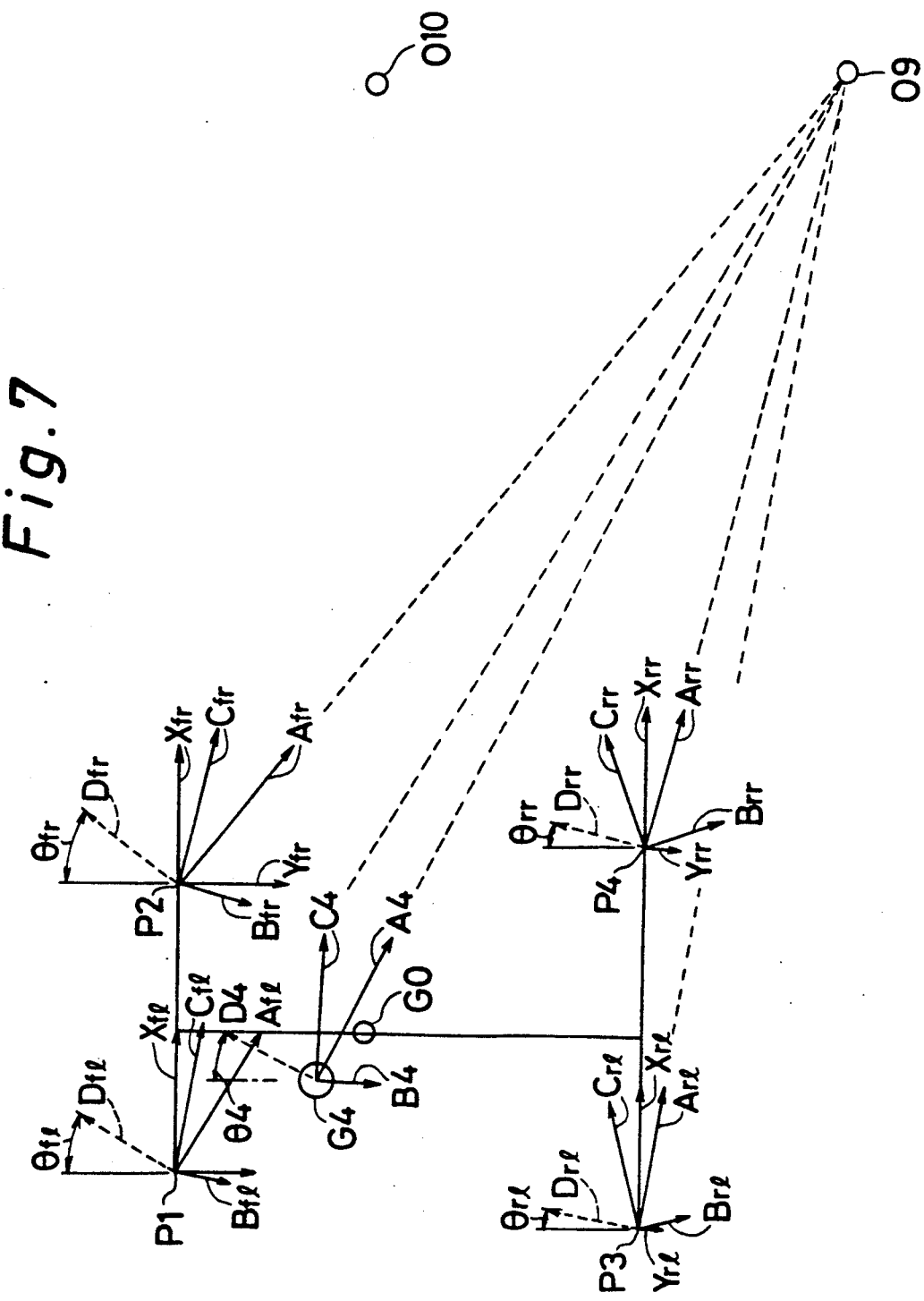
FIG. 7 is a view illustrating traveling of a vehicle turning in deceleration.

FIG. 7 is a view for illustrating traveling of a vehicle turning in deceleration. In this case brake forces Bfl, Bfr, Brl, Brr are acting perpendicular to the individual cornering forces Cfl, Cfr, Crl, Crr at the individual points of application P1, P2, P3, P4. The cornering force Cfl with the braking force Bfl, the cornering force Cfr with the braking force Bfr, the cornering force Crl with the braking force Brl and the cornering force Crr with the braking force Brr give rise to resultant forces Afl, Afr, Arl, Arr respectively. The directions of these resultant forces Afl, Afr, Arl, Arr are toward the center point 09, which is the point of intersection for the resultant forces Afl–Arr at the brake wheel. As described below, the degree of steering stability and whether the steering property of a given vehicle is "neutral steer" or not can be determined through determination of these resultant forces Afl, Afr, Arl, Arr.

While turning in decelerated as described above, the center of gravity of the car body is shifting to the point G4. On this point of gravity G4 a resultant force A4 is acting, this being the sum of a resultant cornering force C4 and resultant braking force B4, which, in turn, are the total of the aforementioned cornering forces Cfl, Cfr, Crl, Crr and the brake forces Bfl, Bfr, Brl, Brr respectively. This resultant braking force B4 acts perpendicular to the resultant cornering force C4. The resultant force A4 is acting toward the center point 09. Actually, however, the directions of the resultant forces Afl, Afr, Arl, Arr do not intersect at the center point 09, thus resulting in the state of "over steer". It is a common property of vehicles that, when the front wheels are locked due to sudden braking, the vehicle tends to travel ahead with the function of the steering wheel lost due to skidding of the front wheel, while, when the rear wheels are locked the directional stability tends to be lost due to skidding of the rear wheels. Hence, it is a usual practice to design the portions of the braking force for the rear wheel as small as possible to ensure against locking of the rear wheels to avoid loss of the directional stability which is known to be most dangerous. Hence, the braking force of the front wheels is larger than that of the rear wheels. When the vehicle is turning in deceleration, the direction of the resultant forces of the front wheel Afl, Afr move off the center point 09 clockwise in a large circle to intersect with the resultant forces of the rear wheel Arl, Arr. Hence, the apportioning of the braking force to the front and rear wheels is so designed that the portion for the front wheels is large when traveling straight, while the portions of the braking force for the individual wheels are made equivalent to their cornering forces, that is, they are so controlled that the direction of the resultant force for each wheel is toward the whirling center 09.

When the braking force is caused to act on the front wheels only by application of engine brake in the case of the front drive vehicle, "over steer" mode of traveling is bound to result for the direction of the resultant forces Afl, Afr at the points of application P1, P2 intersect the directions of the whirling forces Crl, Crr at the points of application P3, P4 on the rear wheels. When in the rear drive vehicle engine braking force is applied to the rear wheels only, the directions of the resultant forces Arl, Arr at the points of application P3, P4 of the rear wheel are off the directions of the whirling forces Cfl, Cfr at the points of application P1, P2 of the front wheels, hence the vehicle is bound to travel in an "under steer" stage. In the case of the 4-wheel drive vehicle, the braking force is applied on each wheel when the engine brake is actuated, this adversely influencing the steering stability and steering property.

Therefore, a control means for the front drive vehicle, rear drive vehicle and 4-wheel drive vehicle are explained.

A first control means consists in steering the wheel for which it is desired to change the directions of the resultant forces Afl, Afr, Arl, Arr. Such a control means is essentially the same as the first control means for use in turning in acceleration of the 4-wheel drive vehicle shown in FIG. 6, hence further explanation is omitted here. When no satisfactory steering stability or no "neutral steer" steering property is attainable by this first control means, a second controlling means may be used for adjusting the brake force for each wheel. By this, it is possible to let the direction of "directional component force" change clockwise by increasing the braking force or alternatively change counterclockwise by decreasing the braking force. With a driving wheel, if the braking force required is smaller than the braking force applied by the engine brake, it is possible to relieve the braking force of the engine brake by utilization of a small portion of the driving force to thus modify the braking force. By these first and, second controlling means it is feasible to control the center point 09 to approach the center point 010 of the turning radius desired by the driver to thus enable turning in deceleration at a small attitude angle.

Figure 8:
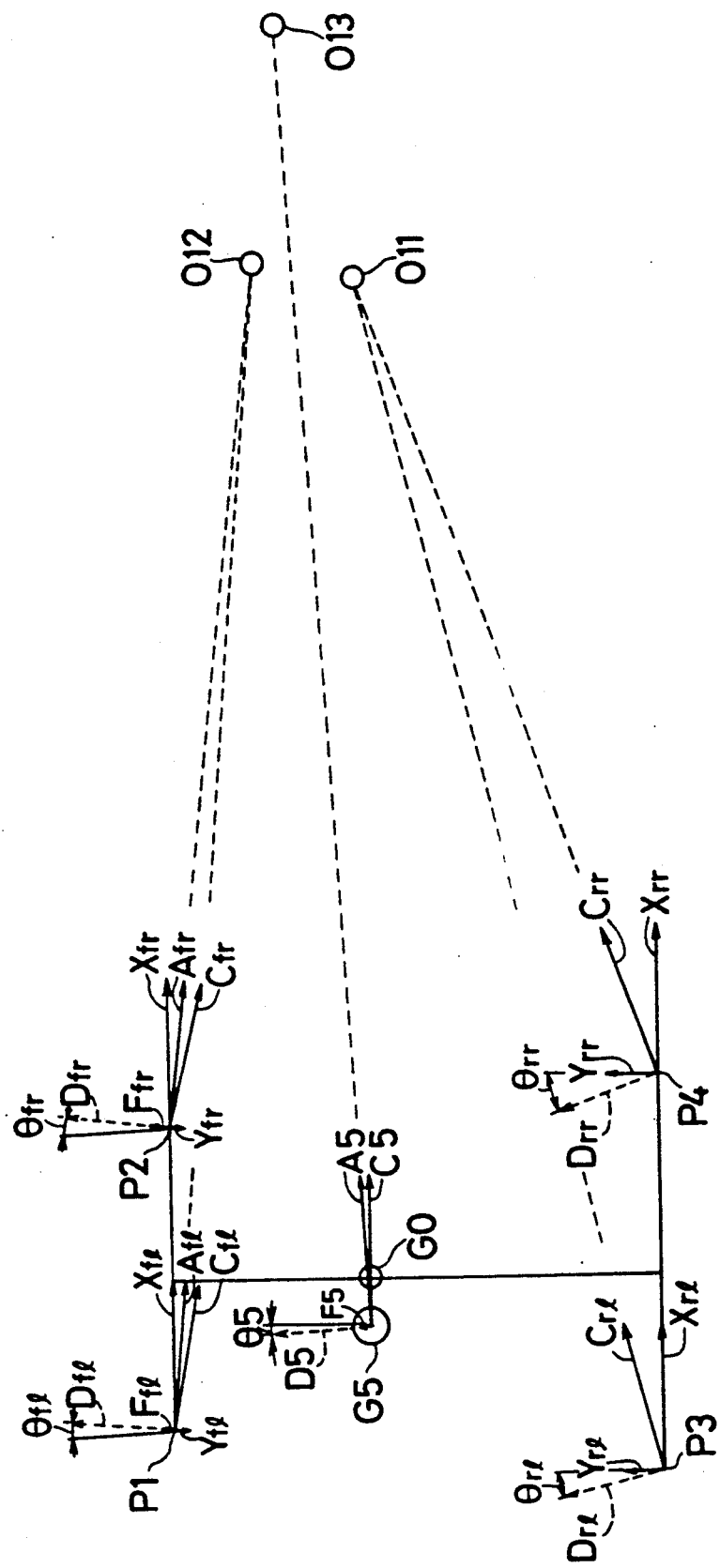
FIG. 8 is a view illustrating traveling of a front drive vehicle turning at a constant speed.

FIG. 8 is a view for illustrating traveling of a front wheel drive vehicle turning at a constant speed. Compared with the arrangement shown in FIG. 4, the attitude angle $\theta 5$ is extremely small, for the driving forces Ffl, Ffr are large enough to offset the various resistances the car body is subjected to, hence, the state of traveling is weak "under steer". Therefore, the distance between the cornering center 011 and the center point 012 is less than when turning in acceleration, and the turning radius is shortened with the center point 013 having moved to be in the vicinity of the center point 011.

Figure 9:
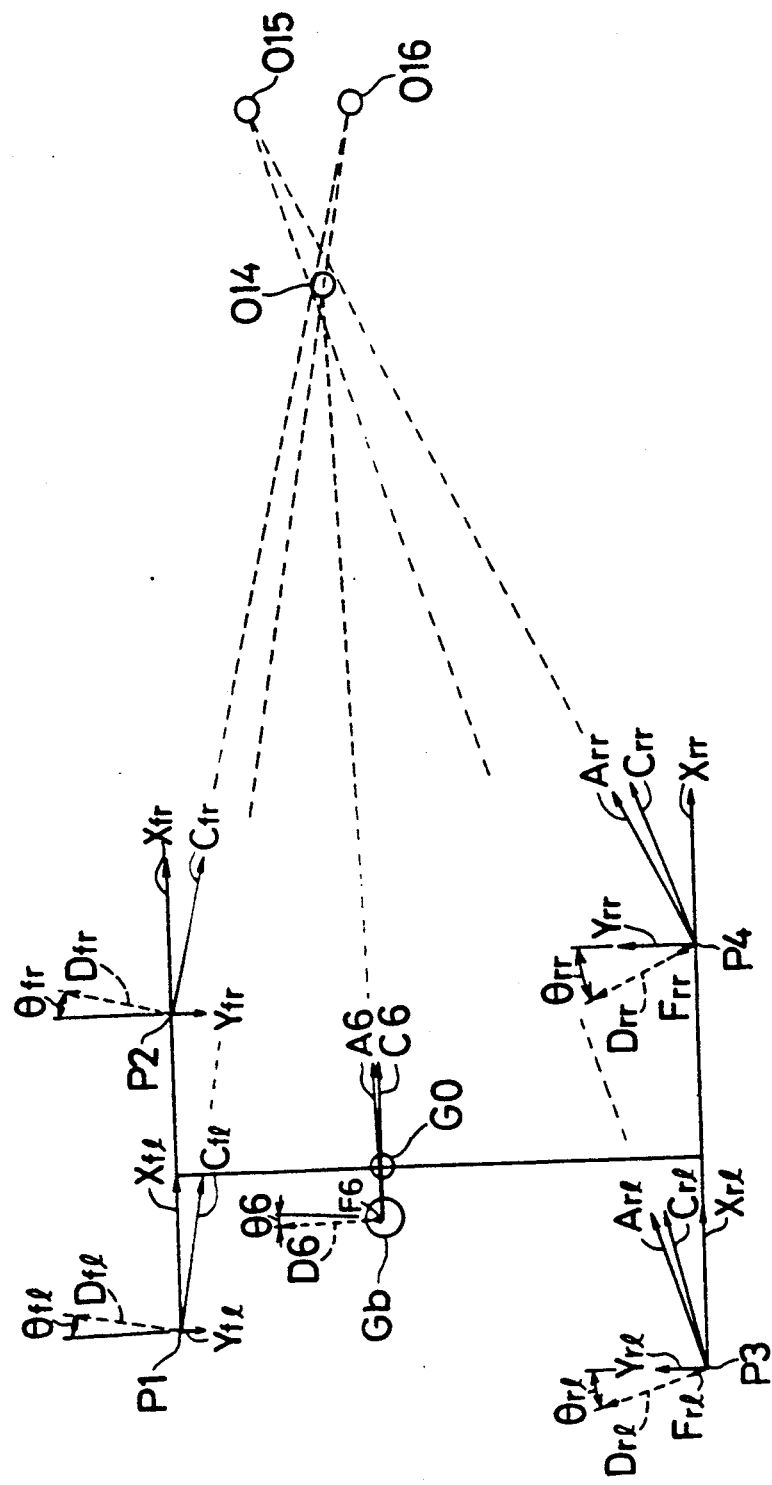
FIG. 9 is a view illustrating traveling of a rear drive vehicle turning at a constant speed.

FIG. 9 is a view for illustrating traveling of a rear drive vehicle turning in at a constant speed. Compared with the arrangement shown in FIG. 5 for the rear drive vehicle turning in acceleration, the attitude angle $\theta 6$ is small as the driving forces of the rear wheels Frl, Frr are large enough to offset the various resistances the car body is subjected to, hence the state of traveling is weak "over steer". Therefore, the center point 014 is nearer to the center point 016 than the center point shown in FIG. 5.

Figure 10:
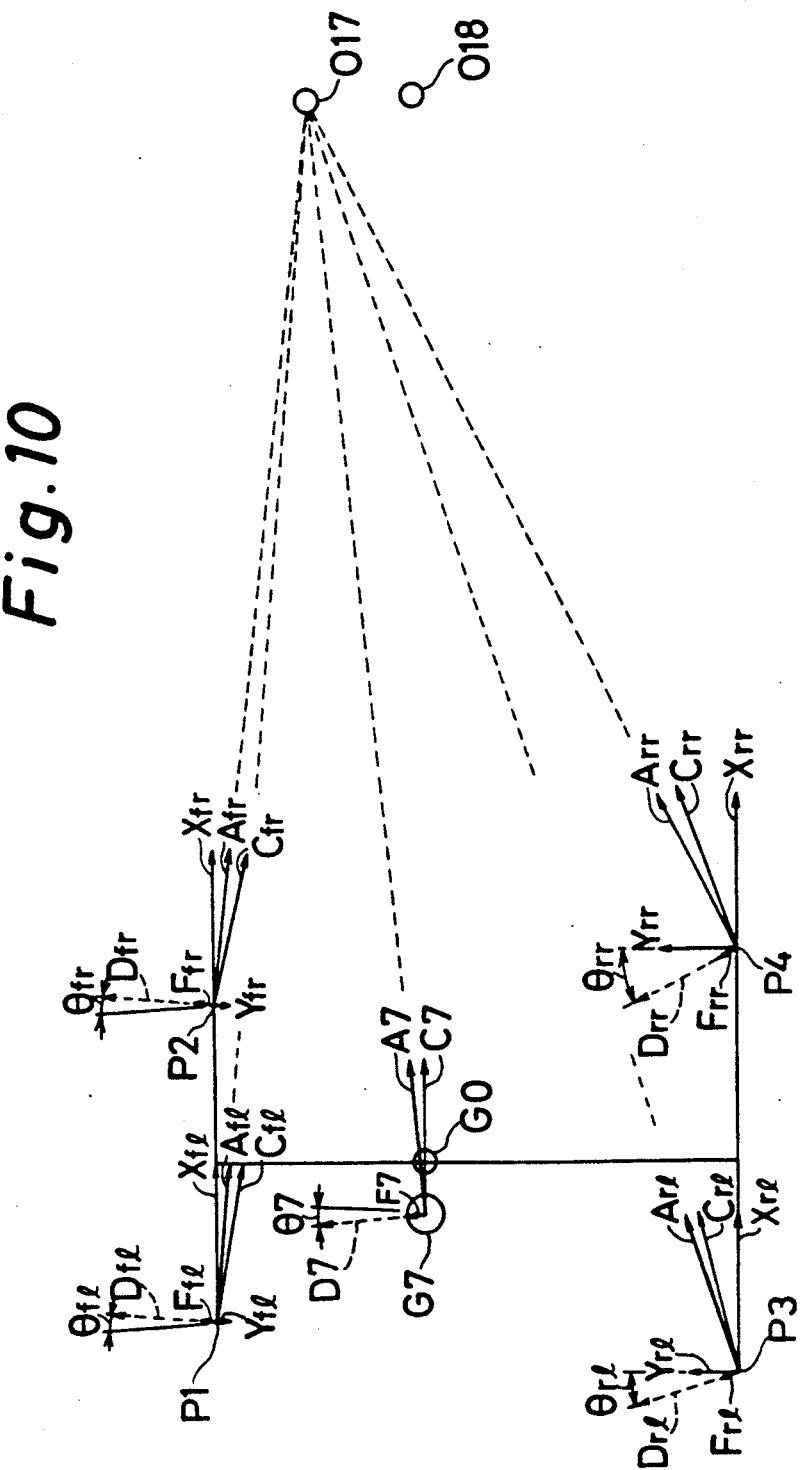
FIG. 10 is a view illustrating traveling of a 4-wheel vehicle turning at a constant speed.

FIG. 10 is a view for illustrating traveling of a 4-wheel drive vehicle turning at a constant speed. Compared with the 4-wheel drive vehicle turning while accelerating as shown in FIG. 6, the driving forces Ffl, Ffr, Frl, Frr are barely enough for offsetting the various resistances the car body is subjected to. Hence, the attitude angle $\theta 7$ is small and the center point 017 is moved to be in the vicinity of the center point 018.

Figure 11:
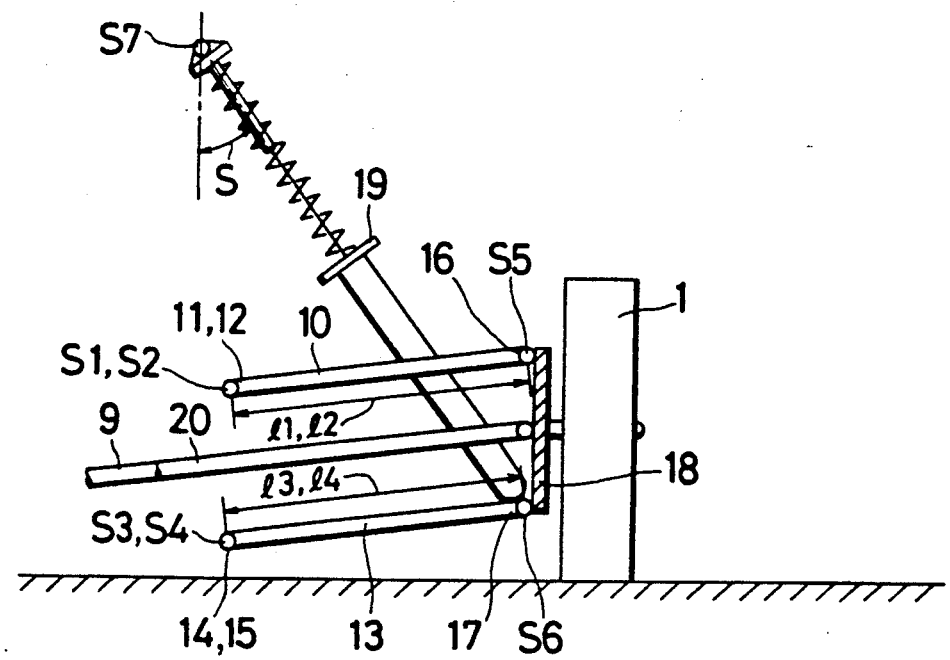
FIG. 11 is a side view of a front wheel 1 as viewed from behind a car body.
Figure 12:
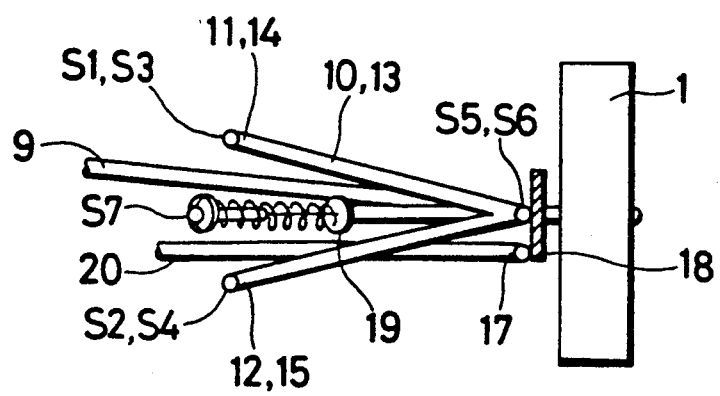
FIG. 12 is a plan view of the front wheel 1 viewed from above.

FIG. 11 is a side view of the front wheel 1 as viewed from behind a car body, and FIG. 12 is a plan view of the front wheel 1 viewed from above. Also referring to FIG. 1 and assuming that the aforementioned cornering forces Cfl, Cfr, Crl, Crr, driving forces Ffl, Ffr, Frl, Frr, resultant forces Afl, Afr, Arl, Arr and braking forces Bfl, Bfr, Brl, Brr are acting at the points of application P1-P4 as components Fx, Fy, Fz in the X, Y and Z directions, method for determining the magnitudes of these components, Fx, Fy and Fz is described.

The distances between the ends 11 and 16, on the one hand, and the ends 12 and 16, on the other, of the upper shaft 10 and lower shaft 13 are taken as l1, l2 respectively, and the distances between the ends 14 and 17, on the one hand, and the ends 15 and 17, on the other, are taken as l3, l4 respectively. The lateral, longitudinal and vertical directions of the car body are taken as the X, Y and Z directions respectively and "rightward direction", "front direction" and "upward direction" of the car body are taken as "positive directions." Then, the components in X-direction of the distances l1, l2, l3, l4 are distances l1x, l2x, l3x, l4x, those in Y-direction are l1y, l2y, l3y, l4y, and those in Z-direction are l1z, l2z, l3z, l4z respectively. The distance l1z and distance l2z are the same. When it is presumed that the distances l3z and 14z are also the same and it is assumed that there is a plane X-Z having therein the end 16 of the upper shaft 10 attached to the mounting plate 18 and the end 17 of the lower shaft 13, the upper shaft 10 and the lower shaft 13 are located symmetrical with respect to the X-Z plane. The upper shaft 10 and the lower shaft 13 are always parallel to each other regardless of displacement of the wheel 1 in the Z-direction. Hence, even if the wheel 1 is the displaced in Z-direction, the components in Y-direction of the distances 11-14 between the upper shaft 10 and the lower shaft 13 remain unchanged. Since the distances 11-14 are all equal in length, these can be represented by the distance 11. Likewise, the distances in the X, Y and Z direction can be represented by 11x, 11y and 11z respectively.

When the wheel 1 has been displaced in the Z-direction, the distance 11y remains unchanged, while the distances 11x and 11z are changed. A damper 19 displaces in the X-Z plane when the wheel 1 has moved in Z-direction. When it is assumed that the length between both ends of the damper 19 is equal to the distance "e" (See FIG. 1.), the distance "e" is composed of a component "ex" in X-direction and component "ez" in Z-direction. The angle of this damper 19 is "S" with respect to the Z-direction.

Referring now to FIG. 12, and assuming that, when the wheel 1 has displaced in Z-direction, the extents of displacement in the X- and Z-directions are $\pm\Delta X$ and $\pm\Delta Z$, the method of measuring these extents of displacement, $\pm\Delta X$ and $\pm\Delta Z$, is described below.

A first measuring means consists in first providing a detector for measuring dimensions, as will be described below, for measuring the distance "e" between both ends of the damper 19, measuring the distance "e", and having in advance tabulated the numerical data on the extents of displacement $\pm\Delta X$, $\pm\Delta Z$ corresponding to the measured distance "e", and inputting such tabulated data in a memory device 90 which is to be described later. It is thereby possible to determine the extents of displacement $\pm\Delta X$, $\pm\Delta Z$ corresponding to the measured distance "e". Alternatively, it is possible to do this measurement without using the aforementioned tabulated data, by measuring the distance "e" by means of the detector dimensions mentioned above, also detecting the angle "S" of the damper 19 against the ca body by means of an angle detector S7 mounted to the mating socket 27 at the outer end of the damper 19, and determining the components "ex" and "ez" in X- and Z-direction respectively by formulas (2) and (3) below.

$$ex = e \cdot \sin S \qquad (2)$$

$$ez = e \cdot \cos S \qquad (3)$$

By inputting the components of the distance "e" in X-and Z-direction, when the wheel 1 is not displaced in Z-direction, as reference values ex and ez into the memory device 90 in advance, it is possible to determine the extents $\pm\Delta X$, $\pm\Delta Z$ by the formulae (4), (5) below.

$$\pm\Delta X = ex - ex0 \qquad (4)$$

$$\pm\Delta Z = ez - ez0 \qquad (5)$$

A second measuring means consists in attaching the angle detector S5 or S6 for measuring the vertical displacement angle to either the upper shaft 10 and the lower shaft 13 for, as the wheel 1 is displaced in Z-direction, it is accompanied by the change in Z-direction of the upper shaft 10 and the lower shaft 13, and having inputted into the memory device in advance the values of the extents of displacement $\pm\Delta X$, $\pm\Delta Z$ corresponding to the measured angles to thereby determine the extents of displacement $\pm\Delta X$, $\pm\Delta Z$.

A third measuring means consists in attaching a vehicle height detector to the car body and taking the values measured by the vehicle height detector as the reference value $z_0$ to thereby determine the extent of displacement $\pm\Delta Z$ from the reference value $z_0$.

As to the means of determining the distances 11x, 11z by the use of the extents of displacement $\pm\Delta X$, $\pm\Delta Z$ detected by the aforementioned detecting means, further explanation will be made below. When, with the wheel 1 not displaced in the Z-direction, the distances in the X- and Y- direction are inputted in advance as $11X_0$, $11Z_0$ the distances 11x, 11z can be determined by the formulae (6) and (7) below, respectively.

$$l1x = l1x_0 \pm \Delta X \qquad (6)$$

$$lz = l1z_0 \pm \Delta Z \qquad (7)$$

When the third measuring means is used, the extent of displacement $\pm\Delta X$ cannot be determined by the vehicle height detector, hence it is impossible to determine the distance 11x by the aforementioned formula (6). Hence, in this case, the distance 11x is determined by the following formula (8).

$$l1x = \sqrt{l1^2 - (l1z^2 + l1y^2)} \qquad (8)$$

From the aforementioned formula (6) the extent of displacement $\pm\Delta X$ can be determined by the following formula (9).

$$\pm\Delta X = l1x - l1x_0 \qquad (9)$$

The extent of displacement $\pm\Delta X$ can be determined by substituting the distance 11x calculated by the formula (8) in this formula (9).

The means for decomposing the values detected by the aforementioned detectors S1-S4 and the pressure detector S7 into 3 directional components (X-, Y- and Z-direction) and thereby determining the individual components Fx, Fy, Fz is now explained. The values measured by the individual detectors S1, S2, S3, S4 and S7 are taken as p1, p2, p3, p4 and E respectively. The measured values p1, p2, p3 and p4 may either positive or negative but the pressure value E is required to be positive. When the pressure value E is negative, it means that the wheel 1 is off the road surface. The X-direction components of the measured values p1, p2, p3, p4 and E are p1x, p2x, p3x, p4x and Ex respectively, the Y-direction components are p1y, p2y, p3y, p4y and the Z-direction components are p1z, p2z, p3z, p4z and Ez. The Y-direction component of the pressure value E, i. e. Ey, does not exist because the distance Ey is zero. These 3 directional components of the measured values p1, p2, p3, p4 and E can be determined from the dimensional ratios of the upper shaft 10 and the lower shaft 13.

$$\left.\begin{array}{lll} p1x = p1 \cdot \frac{l1x}{l1}, & p1y = p1 \cdot \frac{l1y}{l1}, & p1z = p1 \cdot \frac{l1z}{l1} \\ p2x = p2 \cdot \frac{l1x}{l1}, & p2y = p2 \cdot \frac{l1y}{l1}, & p2z = p2 \cdot \frac{l1z}{l1} \\ p3x = p3 \cdot \frac{l1x}{l1}, & p3y = p3 \cdot \frac{l1y}{l1}, & p3z = p3 \cdot \frac{l1z}{l1} \\ p4x = p4 \cdot \frac{l1x}{l1}, & p4y = p4 \cdot \frac{l1y}{l1}, & p4z = p4 \cdot \frac{l1z}{l1} \\ Ex = E \cdot \frac{ex}{e}, & & Ez = E \cdot \frac{ez}{e} \end{array}\right\} \quad (10)$$

The means of determining the moments acting on the ends 11, 12, 14, 15 of the upper shaft 10 and the lower shaft 13 from the components p1x–p4x and Ex, p1y–p4y, p1z–p4z and Ez calculated by the aforementioned formulae (10).

Of the three directional components Fx, Fy, Fz in X-, Y- and Z-direction at the points of application of the individual tires P1–P4, the components Fx and Fy in the X- and Y-directions influence the upper shaft 10 and the lower shaft 13, but do not act directly on a compression spring 22. The component Fz in the Z-direction does influence the compression spring 22 but does not act directly on the upper shaft 10 and the lower shaft 13. Thus, as to the relation between the compression spring 22 and the components Fx, Fy in X- and Y-direction not acting directly thereon as well as between the upper shaft 10, lower shaft 13 and the component Fz in the Z-direction, compensation is to be made separately by the formulae below, hence it is not to be taken into consideration here. As to displacement of the car body rising and lowering immediately thereafter as the wheels 1 (or any part thereof) pass a convex in the road surface (hereinafter called "bump") and lowering and rising immediately thereafter as the wheels (or any part thereof) pass a concave in the road surface (hereinafter called "rebound"), the force caused thereby acts at the point of application is described below in detail with the directions, X, Y and Z, in which it acts taken into due consideration.

FIG. 13 shows the state in which the rightward component Fx in the X-direction is acting at the point of application as the wheel 1 bumps. As shown in the FIG. 13 (1), the component Fx in X-direction is acting rightward (hereinafter called "positive direction") at the point of application P2 of the wheel 1. This component Fx induce compressive forces in the detectors S1, S2 and tensile forces in the detectors S3, S4.

Then, as shown in FIG. 13 (2) and FIG. 13 (3), the distance between the point of application P2 and the rotational axis of the axle 9 of the wheel 1 in Z direction is taken as "g", and the distances between the detectors S5, S6 and the axle 9 in Z direction are taken as "h" respectively, and these distances "g" and "h" are inputted in advance into the memory device 90. The moment M1 caused to act on the axle 9 by the component Fx in X-direction acting at the tire point of application P2 can be calculated by the following formula (11).

$$M1 = Fx \cdot g \qquad (11)$$

This moment M1 causes compressive forces p1, p2 to occur in the detectors S1, S2, and tensile forces p3, p4 in the detectors S3, S4 respectively. Hence, the moment M2 with an imaginary Y axis passing through the center point of the axle of the wheel 1 as the center is created by the component p1x in X-direction of the compressive force p1 and the component p2x in X-direction of the compressive force p2, while another moment M3 with the imaginary Y axis passing through the center point of the axle of the wheel 1 is caused by the component p3x in X-direction of the tensile force p3 and the component p4x in X-direction of the tensile force p4. At the point to which the detector S6 is attached the component in the X-direction of the restoring force E of the compression spring 22 is acting. Hence, the magnitude of the moment M4 generated in the axle 9 can be determined by the following formula (12).

$$M4 = [(p1x + p2x) - (p3x + p4x) - Ex] \cdot h \qquad (12)$$

At the point to which the detector S5 is attached the components p1z, p2z in Z-direction of the aforementioned compressive forces p1, p2 are generated by the component Fx in X-direction acting at the point of application P2,, while the components pez, p3z in Z-direction are generated at the point to which the detector S6 is attached. Since the components p1z and p2z in Z-direction, on the one hand, and the components p3z and p4z, on the other hand, offset each other, the moment M5 is zero as seen from FIG. 13.

$$M5 = [(p1z + p2z) + (p3z + p4z)] \cdot l1x = 0 \qquad (13)$$

Moment M6 as the resultant of the moment M4 and the moment M5 is as see from the formula (14) below.

$$\begin{aligned} M6 &= Fx \cdot g \\ &= [(p1x + p2x) - (p3x + p4x) - Ex] \cdot h \end{aligned} \qquad (14)$$

Hence, the magnitude of the component Fx in X-direction can be calculated by the following formula (15).

$$Fx = [(p1x + p2x) - (p3x + p4x)] \qquad (15)$$

FIG. 14 is a view showing the state in which the rightward component Fx in X-direction is acting at the point of application P2 when the wheel 1 has been rebounded. As the component Fx acts on the wheel 1, as in the case shown in FIG. 13, the compressive forces p1, p2 are generated in the detectors S1, S2, while the tensile forces p3, p4 are generated in the detectors S3, S4. Hence, the components p1x, p2x in X-direction of the compressive forces p3, p4 act on the detector S5, while the components p3x, p4x in X-direction of the tensile forces p3, p4 act on the detector S6. The moment M4 generated in the axle 9 resulting from these components p1x, p2x, p3x, p4x is as seen from the aforementioned formula (12). The components p1z, p2z in Z-direction of the compressive force p1, p2 and the components p3z, p4z in Z-direction of the tensile force p3, p4 act on the detectors S5 and S6 in the opposite directions.

The moment M5 is generated by these components p1z, p2z in Z-direction and p3z, p4z in the same direction. Hence, the resultant moment M6 composed of the moment M4 generated by the components p1x–p4x in X-direction and the moment M5 generated by the components p1z–p4z is calculable by the aforementioned formula (14), and the component Fx in X-direction acting on the point of application P2 can be calculated by the formula (15) above. The parts corresponding to those shown in FIG. 13 above are indicated by the same symbols and explanation is omitted.

FIG. 15 is a view showing the state in which a leftward component Fx in X-direction is acting at the point of application when the wheel 1 has bumped. When the component Fx acts on the point of application P2 of the wheel 1, the tensile forces p1, p2 are generated in the detector S1, S2, and compressive forces p1, p2 are generated in the detector S3, S4. The components p1x, p2x in X-direction of the tensile forces p1, p2 act on the detector S5 and the components p3x, p4x in X-direction of the compressive forces p3, p4 act on the detector S6. Likewise, the components p1z, p2z in Z-direction of the tensile forces p1, p2 act on the detector S5, and the components p3z, p4z in Z-direction of the compressive forces p3, p4 act on the detector S6. The magnitude of the component Fx acting on the point of application can be calculated from the aforementioned components p1x, p2x, p3x, p4x in X-direction and p1z, p2z, p3z, p4z in Z-direction by the formula (15) above.

FIG. 16 is a view showing the state in which the component Fx in X-direction is acting leftward on the point of application P2 when the wheel 1 has rebounded. In this case, the component p1z and component p2z in Z-direction acting on the detector S5 and the component p3z and component p4z in Z-direction acting on the detector S6 are in the reverse relationship to the case of FIG. 15, and in a like manner to FIGS. 13 through 15, the magnitude of the component Fx acting on the point of application P2 can be calculated by the formula 15 above. In these figures like parts are referred to by like symbols and explanation is omitted.

FIG. 17 is a view showing the state in which a forward component Fy in Y-direction is acting on the point of application P2. As shown in FIG. 17 (1), the forward component Fy in Y-direction is acting on the point of application P2. As shown in FIGS. 17 (2) and FIG. 17 (3), the detectors S5, S6 are located at a distance "i" from the point of application P2, and this distance "i" is inputted in advance into the memory device 90 as a constant. The moment M7 then caused by the component Fy in Y-direction can be determined by the formula (16) below.

$$M7 = Fy \cdot (l1x + i) \quad (16)$$

FIG. 18 is a view showing the state in which the wheel 1 of FIG. 17 has bumped taken from behind in Y-direction, while FIG. 19 is a view showing the state in which the wheel 1 of FIG. 17 has rebounded taken from behind in Y-direction. In the detector S5, the components p1x and p2x as well as components p1z and p2z mutually offset, while in the detector S6 such offsetting takes place between the components p3x and p4x and components p3z and p4z. Hence, with the components p1z-p4z are reversed in mutual directions when the wheel 1 is bumped or rebounded, the components p1x and component p2x mutually offset as well as the components p3x and p4x, hence these do not directly influence the component Fy acting on the point of application P2. Hence in FIG. 17 (2) the detector S5 has acting thereon the sum of the component p1y in Y-direction of the compressive force p1 and the component p2y in Y-direction of the tensile force p2, that is, a component equal to p1y−p2y. Acting on the detector S6, too, as shown in FIG. 17 (3), is the sum of the component p3y in Y-direction of the compressive force p3 and the component p4y in Y-direction of the tensile force p4, that is, a component equal to p3y−p4y. By this is generated the aforementioned moment M7 for steering the wheel 1 to the left. If the traveling direction of the car body is the "normal" direction, the moment M7 caused by the component Fy in Y-direction can be calculated by the formula (17) below.

$$M7 = [(p1y - p2y) + (p3y - p4y)] \cdot l1x \quad (17)$$

The component Fy used in the above formulae (16) and (17) is determined by the formula (18).

$$Fy = [(p1y - p2y) + (p3y - p4y)] \cdot l1x / (l1x + i) \quad (18)$$

FIGS. 20, 21 and 22 are views showing states in which the component Fy is acting toward the rear in Y-direction at the point of application P2 shown in FIGS. 17, 18 and 19. Since the component Fy described above is what is determined with the car body's traveling direction as the "normal" direction, the component Fy is caused to act toward the rear in Y-direction at the point of application P2 of the tire 1, if the component Fy calculated by the formula (18) is a negative value. Since, therefore, the component Fy can be determined in the same way as described above in connection with FIGS. 17-19, like parts are referred to by like symbols with explanation omitted.

FIG. 23 is a view showing the state in which the component Fz is acting positively at the point of application P2 of wheel 1 in Z-direction. In this case the applied component generates a moment for lifting the wheel 1. It is so designed that a compressive force E acts on the detector S7. The distances "e" and "ez" can be determined as described above in connection with FIG. 1, and the value Ez can be calculated from the measured value E of the pressure detector S7 by the formula 10. If the damper loaded with the compression spring 22 is substantially vertical regardless of the vertical stroke of the wheel 1, Ex is extremely small and the measured value E may be deemed roughly the same as Ez.

Hence the magnitude of the moment M10 generated by the component Fz in Z-direction can be determined by formula (19).

$$M10 = Fz \cdot (l1x + i) \quad (19)$$

Moment 11 generated by the component Fz in Z-direction be determined by the formula (20).

$$M11 = Ez \cdot l1x \quad (20)$$

These moments 10 and 11 act to offset each other. Hence, the component Fz is determinable by the formula (21).

$$Fz = Ez \cdot l1x / (l1x + i) \quad (21)$$

It is also possible to determine the component Fz by providing a dimension measuring detector to detect the distance "e" between both ends of the damper 19, vehicle height detector the or the angle detector S5 (or S6) detecting "variable angle" of the upper shaft 10 or the lower shaft 13 and to have the Fz values corresponding to the values measured by these detectors stored in advance in the memory device 90.

In this embodiment the upper shaft 10 and the lower shaft 13 were set under special conditions for convenience in explanation, but their dimensions and the angle therebetween can be set freely subject to complication of the calculations involved.

FIG. 24 is a disassembled schematic view of the damper 19 including a dimensions-measuring detector, and FIG. 25 is a sectional view of the assembled damper 19. The dimensions-measuring detector mentioned above is attached to the damper 19. The damper 19 comprises a supporting member 21, the compression spring 22, a fitting member with the detector S7 attached thereto, a coil core member 25 with a coil 24 set thereon and a power supply 32. The fitting member 23 has a cylindrical shell 26 and a spring holder 27, the shell 26 has set thereon the compression spring 22 and one end of the compression spring 22 is in contact with the spring holder. The other end of the shell 26 has attached thereto an annular contact terminal 28. The coil core member 25 has a tubular core 29 around which the coil 24 is formed and a spring holder 30 fixedly secured to one end of the core 29, and the core 29 is inserted into the shell 26 through the connecting terminal 28 of the aforementioned fitting member 23. The compression spring 22 is loaded between the spring holder 27 of the fitting member 23 and the spring holder 30 of the coil core member 25, and the guide shaft 31 of the supporting member 21 is inserted into the core 29.

When a DC voltage from a power supply 32 is applied between the coil 24 and the contact terminal 28, the voltage between the coil 24 and the contact terminal 28 changes according to the elongation/shrinkage of the damper 19. It is therefore possible to determine the extent of shrinkage/elongation of the damper 19.

FIG. 26 is a block diagram showing the basic composition of the vehicle's steering control apparatus 80 of the invention. Vehicle's steering control device (hereinafter referred to as "control apparatus") 80 comprises first detection means 81 for detecting the direction of the resultant force determined by the car body's acceleration acting on each wheel, second detection means 82 for detecting the traveling direction and turning radius desired by the driver, a microcomputer (hereinafter called "CPU") 83 as means of controlling the steering angle of and the controlling force or driving force acting on each wheel so that the point of intersection of the resultant forces from the individual wheels in response to the outputs, from the first detection means 81 and the second detection means 82, that is, the point where the aforementioned cornering centers 01-018 agree, is positioned on the turning radius "r" with the center of gravity of the car body as a center by the aforesaid second control means 82, a steering angle controller 84 as a means of controlling the steering angle of each wheel in relation with the outputs from the first detection means 81 and the second detection means 82, and a vehicle speed controller 85 as means of controlling the braking force or driving force in relation to the outputs from the first detection means 81 and the second detection means 82.

The first detection means 81 comprises the detection means 86–89 provided for the upper shaft 10, lower shaft 13 and damper 19 for the left front wheel 1a, right front wheel 1b, left rear wheel 1c and right rear wheel. These detection means 86–89 have individual compositions like the aforementioned detectors S1–S7, and the detectors S1–S7 corresponding to the individual detection means 86–89 are indicated with affixes a, b, c, d. The outputs from the individual detection means 86–89 are inputted to CPU 83. The outputs from the second detection means 82 are inputted into CPU 83, and by means of the components Fx stored in the memory 90 and Fy and Fz-related data, et. cetera, proper treatment is done in response to the outputs from the second detection means 82.

This CPU 83 computes the components Fx, Fy, Fz on the basis of the values measured by the detectors S1a–S7a, S1b–S7b, S1c–S7d and determine the point of intersection of the resultant forces from each wheel, and also computes the turning radius desired by the driver corresponding to the steering angle inputted by the second detection means 82. It is also so controlled that the directions of the resultant forces so computed for the individual wheels intersect at one point and that such point of intersection is positioned on the desired turning radius "r0" by moving it under control on an imaginary circle having the center of gravity as the center. As an example of such control means there is a method of lowering the gain in inverse proportion to the gain of steering. By steering gain is here meant the ratio of the turning radius in actual turning to the input of the handling steering angle. Hence, the desired turning radius "r0" can be determined by the formula (22).

$$r0 = k / g \cdot S \tag{22}$$

where:
g = gain of steering
S = handling steering angle
k = proportional constant It is possible to keep turning while traveling in the "neutral steer" condition by determining the desired turning radius and controlling so that the directions of the resultant forces of the individual wheels approach the center point of the desired traveling radius.

Such control signal from CPU 83 are inputted into the steering angle controller 84 and the vehicle speed controller 85. The steering angle control device 84 sends the signals for driving a steering mechanism 91 which is made up of a steering cylinder et cetera and serves to steer the wheel 1. The vehicle speed controller 85 comprises a driving force controller 92 and braking force controller 93. The driving force controller 92 supplies the power required for driving the electromagnetic solenoid and an actuator or the like (not shown) is provided with, and controls the force for driving the wheel 1. The braking force controller 93 supplies the power required for driving the wheel cylinder et cetera of the control mechanism 95 to thereby control the braking force required by each wheel. These steering mechanism 91, driving mechanism 94 and braking mechanism 95 can be individually controlled so that the turning radius "r" is controlled to be on the aforementioned turning radius "r0". According to the type of vehicles such as front drive vehicle, rear drive vehicle and 4-wheel vehicle et cetera, such control may well be accomplished by first controlling the wheel's steering angle and then controlling the braking force or the driving force.

FIG. 27 is a schematic view showing another embodiment of the invention, FIG. 28 is a side view of the wheel 1 as viewed from behind the car body and FIG. 29 is a plan view of the wheel 1 as viewed from above. In the vicinity of both top ends of the mounting plate 40 to which the wheel 1 is mounted, there are attached a pair of upper shafts 41, 42 and in the vicinity of both bottom ends of the mounting plate 40 are attached are a pair of lower shafts 43, 44. Between the upper shafts 41, 42 and lower shafts 43, 44, on the one hand, and the mounting plate 40, on the other hand, are connected or inserted angle detectors S11, S12 and angle detectors S13, S14. The other ends of the upper shafts 41, 42 and the lower shafts 43, 44 are attached to the car body (not shown) with pressure detectors S21, S22 and pressure detectors S23, S24. The distances between both ends of such upper shafts 41, 42 and lower shafts 43, 44 are l1, l2, l3, l4, and the X-direction components for the distances are distance l1x, l2x, l3x, l4x, and the Z-direction components are distances l1z, l2z, l3z, l4z. There is no inclination in Y-direction, hence the "component distance" in this direction is zero. Hence, the upper shafts 41, 42 and lower shafts 43, 44 are parallel to the X - Z plane regardless of bumping or rebounding of the wheel 1. Hence, the distances l1–l4 is represented by 1, distances l1x–l4x by l1x and distances l1z–l4z by l1z. The damper 19 has one end thereof 45 attached to the car body via a pressure detector S25 and the other end to the mounting plate 40 via a pressure detector S26. With this damper 19 the distance between both ends 45, 46 is "e", and X-direction component thereof is "ex" and Y-direction component is "ez". In the X-Z plane the damper 19 is an angle of S1 off the perpendicular line.

An axle 47 runs through near the center of the mounting plate 40 and is attached to where the brake device does not rotate. This axle 47 is not provided when the wheel 1 is not a driving one. A rod 48 passing through the mounting plate 40 near its either side is connected to a braking mechanism provided for the wheel 1, and the other end thereof is connected to the steering mechanism, if not directly.

FIG. 30 are views showing the state in which the component Fx is acting rightward in X-direction on the point of application P2 when the wheel 1 has bumped. As shown in FIG. 30 (1), the component Fx is acting rightward in X-direction on the point of application P2. This component Fx generates a moment for inclining the wheel 1 and the axle 47 toward the left. As seen from FIGS. (2) and (3), the distance between the point of application P2 and the axle in Z-direction is taken as "g" and the distances between the axis of the axle 47 and the detectors S11, S12 and detector S13 as well as detectors S13 and S14 in Y-direction are taken as "h" respectively. Under such conditions, the component Fx acting on the point of application P2, the magnitude thereof, can be calculated by the formula(15) as in the embodiment cited above, hence explanation about it is here omitted. Also, when the component Fx is acting leftward in X-direction on the point of application, the magnitude of Fx can be determined as a negative value, hence explanation about it is omitted.

FIG. 31 are views showing the state in which the component is acting rightward in X-direction on the point of application when the wheel 1 has rebounded. Such a component Fx, the magnitude thereof, too, is calculable by the formula (15), hence further explanation is omitted to avoid overlapping.

FIG. 32 are views showing the state in which the component Fy is acting forward in Y-direction on the point of application P2. The detectors S11–S14 and the point of application are disposed with a distance in between being "i" in X-direction. A moment M12, the magnitude thereof, required for steering the wheel 1 to the left can be determined by the formula (23) below.

$$M12 = Fy \cdot (l1x + i) \quad (23),$$

The detectors S21, S22, S23 and S24, which detect the compressive and tensile forces acting on the rod 41, 42, 43 and 44, also detect the pressure in Y-direction, namely the rotary torque with the Z-axis passing through the detectors S21, S22, S23 and S24 as the center and, with the rotation toward the front of the car body as "normal" rotation, and also detect the individual rotary torques by pressure detectors S21, S22, S23 and S24 as t1, t2, t3 and t4, and the total torque 4 can be determined by the following formula (24).

$$T = t1 + t2 + t3 + t4 \quad (24)$$

Hence, the moment M12 is equal to the rotary torque T, as seen from the formula (25) below.

$$Fy \cdot (l1x + i) = t1 + t2 + t3 + t4 \quad (25)$$

Therefore, the component Fy can be determined by the formula (26) below.

$$Fy = (t1 + t2 + t3 + t4)/(l1x + i) \quad (26)$$

When the component in Y-direction at the point of application is directed rearward, the component Fy assumes a negative value.

FIG. 33 is a view showing the state in which the component F is acting above the point of application of the wheel 1 in Z-direction. In this case the component Fz is acting on the point of application P2 only in Z-direction. Under such a condition, as already explained in connection with FIG. 23, there is generated a moment for lifting the wheel 1. Detection of this component Fz can be done in the same way as illustrated in FIG. 23 by the use of a vehicle height detector, angle detectors S11, S12, S13, S14 or a dimensions-measuring detector, hence further explanation is omitted.

FIG. 34 is a perspective view showing still another embodiment of the invention, FIG. 35 is a sectional view of the supporting shaft 60 and FIG. 36 is a sectional view of a supporting shaft 60a. L-sectioned supporting shaft 60 has fixed thereto bar-shaped supporting members 61, 62 at a right angle against each other. This supporting shaft 60 is made up of a portion 63 to which the ends of the supporting members 61, 62 are attached and a bent portion 64 extending from the portion 63 parallel to the supporting member 61. This supporting shaft 60 has attached thereto a supporting member 65. As shown in FIG. 35, the supporting member 61 has formed on one side thereof a rail 67 which is formed to fit in the mating recess formed in the supporting shaft 60. Thus, with the rail 67 formed on the supporting member 65 to be fitted in a mating recess, the supporting member 65 is vertically movable along the mating recess 66 in the supporting shaft, the supporting member 65 is formed L-sectioned, and is made up of a portion 68 in which the aforementioned rail 67 is formed and a continued portion 69 which is formed perpendicular thereto. Between the portion 69 of the supporting member 65 and the portion 64 of the supporting shaft 60 there is attached a damper 70 parallel to the portions 63 and 68. This damper has attached thereto the aforementioned detector (See FIG. 24 and FIG. 25.) or an ordinary damper is used instead of a dimensions/detector to the damper 70, and further the vehicle height detector described in the embodiment 1 may be provided. The portion 69 of the supporting member 65 has attached thereto a fitting plate 71. This fitting plate has a hole around its center for an axle 72 to pass therethrough. In one end portion of this fitting plate 71 there is provided a hole for a rod 73 to pass therethrough where the brake device does not rotate, and this rod 73 is connected with a driving cylinder or the like relating to the steering mechanism. When the aforementioned fitting plate 71 is pressed by this rod 73, the wheel 1 is steered to the left, and vice versa. The aforementioned supporting shaft 60 and the supporting member 65 are, as shown in FIG. 36, possibly so arranged that the supporting member 65a is housed in the hollow supporting shaft.

FIG. 37 is a view showing the state in which the component Fx in X-direction and the component Fz in Z-direction are acting together on the point of application P2 of the wheel 1. The component in X-direction generates a moment for inclining the wheel 1 to the left. Between the detector S62 and the point of application P2 there is a distance in Z-direction, and the detector S62 and the detector S60 are disposed with a distance of "c" in Z-direction. These distances "b", "c" are to be inputted in advance into the memory. The moment N14 caused by the component Fx in X-direction is as shown in the formula (27) below.

$$M14 = Fx \cdot b \tag{27}$$

This moment M14 causes a tensile force Px in the detector S60. When the right side of the car body is taken as the normal side, the magnitude of the moment M15 caused by the component in X-direction can be determined by the following formula (28).

$$M15 = -Px \cdot c \tag{28}$$

Hence, the relationship between these moments M12 and M13 is represented by the following formula (29).

$$Fx \cdot b = -Px \cdot c \tag{29}$$

Hence, the component Fx is determinable by the formula (30) below.

$$Fx = -Px \cdot c/b \tag{30}$$

The component Fz generates a moment M16 to lift the wheel 1. The distance between the detector S60 and the point of application P2 is "d" in X-direction and that between the detector S59 and the detector S62 is "f" in X-direction. These distances "d" and "f" are to be inputted as constants in advance into the memory device. Then, the magnitude of the moment M15 caused by the component Fz in Z-direction can be calculated by the following formula.

$$M16 = Fz \cdot d \tag{31}$$

This moment M16 gives rise to a pressure Pz in the detector S62. The vertically up direction being taken as the normal direction, the component in Z-direction can be calculated by the following formula.

$$M17 = Pz \cdot f \tag{32}$$

Hence the relation between these moments M16, M17 is represented by the formula (33)

$$Fz \cdot d = Pz \cdot f \tag{33}$$

The magnitude of the component Fz, therefore, can be determined by the following formula (34).

$$Fz = Pz \cdot f/d \tag{34}$$

FIG. 38 is a view showing the state in which the component Fy in Y-direction is acting on the point of application of the wheel 1. On the point of application P2 the component in Y-direction is acting. This component Fy is known to cause the moment M18, which steers the wheel 1 to the left. Hence the magnitude of the moment M18 caused by the component Fy in Y-direction can be determined by the formula (35).

$$M18 = Fy \cdot d \tag{35}$$

This moment M18 causes the tensile force Py in the detector 61.

This moment M18 causes the tensile force Py in the detector S61, there is a distance "m" between the detector S60 and the detector S61 and this distance is inputted into the memory device in advance. The component Fy is, when the Z-direction of the car body is taken as the "normal" direction, the moment M19 caused by the component in Y-direction direction and can be calculated by the formula (36).

$$M19 = -Py \cdot m \tag{36}$$

The relationship between the moments M18 and M19 is represented formula (37).

$$Fy \cdot d = -Py \cdot m \tag{37}$$

hence the component Fy, the magnitude thereof, can be calculated by the formula (38).

$$Fy = -Py \cdot m/d \tag{38}$$

As described above referring to FIG. 26, it is possible to control the steering angle of and the driving force and the braking force for each wheel to thereby improve the vehicle's traveling stability by determining the magnitudes of the component Fx in X-direction and the component Fy in Y-direction, and also by inputting the outputs of the detectors S60, S61 and S62 into CPU 90.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A steering control apparatus for a vehicle having a plurality of wheels and to be driven by a driver, said apparatus comprising:

first detection means for sensing forces, caused by at least cornering of the vehicle and a driver induced change in velocity of the vehicle, acting upon each one of the wheels;

second detection means for sensing a driver induced desired turning direction and turning radius;

means for determining a magnitude and direction of a resultant force acting upon each one of the wheels from said forces sensed by said first detecting means;

means for determining a steering angle correction for at least one of the wheels for causing said directions of said resultant forces to substantially intersect at said desired turning direction and turning radius;

means for correcting the steering angle of the at least one of the wheels by said steering angle correction;

means for determining a wheel velocity correction for at least one of the wheels for causing said directions of said resultant forces to substantially intersect at said desired turning direction and turning radius;

means for correcting the wheel velocity of the at least one of the wheels for which a wheel velocity correction was determined by said wheel velocity correction means; and means for controlling said steering angle correcting means and said wheel velocity correcting means by causing said steering angle correcting means to act prior to said wheel velocity correcting means.

* * * * *